(12) United States Patent
Park et al.

(10) Patent No.: US 9,477,396 B2
(45) Date of Patent: Oct. 25, 2016

(54) DEVICE AND METHOD FOR PROVIDING A USER INTERFACE

(75) Inventors: Yong Gook Park, Yongin-si (KR); Min Kyu Park, Seongnam-si (KR); Hyun Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 13/007,012

(22) Filed: Jan. 14, 2011

(65) Prior Publication Data

US 2012/0019562 A1   Jan. 26, 2012

Related U.S. Application Data

(63) Continuation-in-part of application No. 12/625,213, filed on Nov. 24, 2009.

(30) Foreign Application Priority Data

Nov. 25, 2008 (KR) .......... 10-2008-0117358
Nov. 23, 2009 (KR) .......... 10-2009-0113076

(51) Int. Cl.
*G06F 3/041* (2006.01)
*G06F 3/0488* (2013.01)

(52) U.S. Cl.
CPC ................... *G06F 3/0488* (2013.01)

(58) Field of Classification Search
USPC .......................................................... 345/173
See application file for complete search history.

(56) References Cited

U.S. PATENT DOCUMENTS

| | | | |
|---|---|---|---|
| 4,868,912 A * | 9/1989 | Doering .................. | 345/175 |
| 5,767,842 A | 6/1998 | Korth | |
| 6,289,107 B1 | 9/2001 | Borchers et al. | |
| 6,392,636 B1 | 5/2002 | Ferrari et al. | |
| 7,339,580 B2 | 3/2008 | Westerman et al. | |
| 7,519,223 B2 | 4/2009 | Dehlin et al. | |
| 7,812,826 B2 | 10/2010 | Ording et al. | |
| 7,812,862 B2 | 10/2010 | Wang et al. | |
| 8,164,577 B2 | 4/2012 | Tsuzaki et al. | |

(Continued)

FOREIGN PATENT DOCUMENTS

| | | |
|---|---|---|
| CN | 1503956 | 6/2004 |
| CN | 1685301 | 10/2005 |

(Continued)

OTHER PUBLICATIONS

Chinese Office Action dated Sep. 25, 2012 Issued for Chinese Patent Application No. 2009-10225143.1.

(Continued)

*Primary Examiner* — Jonathan Boyd
(74) *Attorney, Agent, or Firm* — H.C. Park & Associates, PLC

(57) ABSTRACT

A device and method for providing a user interface using information are provided. The device includes a display unit, a sensor and a controller. The display unit displays at least one graphic user interface (GUI). The sensor generates a sensor signal according to a user's finger touch input. The controller receives the sensor signal from the sensor, identifies a touch area and an adjacent area based on the received sensor signal, generates touch finger shape-based information according to the identified touch area and the identified adjacent area, and controls the display unit to display the GUI according to the generated finger shape-based information.

22 Claims, 34 Drawing Sheets

(56) References Cited

U.S. PATENT DOCUMENTS

| | | |
|---|---|---|
| 8,209,628 B1 | 6/2012 | Davidson |
| 2002/0054695 A1 | 5/2002 | Bjorn et al. |
| 2003/0048260 A1 | 3/2003 | Matusis |
| 2004/0132490 A1 | 7/2004 | Jerbi et al. |
| 2004/0204129 A1 | 10/2004 | Payne et al. |
| 2006/0022955 A1 | 2/2006 | Kennedy |
| 2006/0026536 A1 | 2/2006 | Hotelling et al. |
| 2006/0038789 A1 | 2/2006 | Ban et al. |
| 2006/0125799 A1* | 6/2006 | Hillis et al. ........... 345/173 |
| 2006/0197750 A1 | 9/2006 | Kerr et al. |
| 2007/0097096 A1 | 5/2007 | Rosenberg |
| 2007/0247435 A1 | 10/2007 | Benko et al. |
| 2007/0257890 A1 | 11/2007 | Hotelling et al. |
| 2007/0273658 A1 | 11/2007 | Yli-Nokari et al. |
| 2007/0300182 A1 | 12/2007 | Bilow |
| 2008/0055263 A1* | 3/2008 | Lemay et al. ........... 345/173 |
| 2008/0094368 A1* | 4/2008 | Ording et al. ........... 345/173 |
| 2008/0158147 A1 | 7/2008 | Westerman et al. |
| 2008/0158185 A1 | 7/2008 | Westerman |
| 2008/0163131 A1 | 7/2008 | Hirai et al. |
| 2008/0168403 A1 | 7/2008 | Westerman et al. |
| 2008/0192024 A1 | 8/2008 | Mita |
| 2008/0273013 A1 | 11/2008 | Levine et al. |
| 2009/0015555 A1 | 1/2009 | Takashima et al. |
| 2009/0073194 A1 | 3/2009 | Ording et al. |
| 2009/0085881 A1 | 4/2009 | Keam |
| 2009/0153490 A1* | 6/2009 | Nymark et al. ........... 345/169 |
| 2009/0189867 A1 | 7/2009 | Krah et al. |
| 2009/0201257 A1 | 8/2009 | Saitoh et al. |
| 2011/0037727 A1 | 2/2011 | Lee et al. |

FOREIGN PATENT DOCUMENTS

| | | |
|---|---|---|
| CN | 101809880 | 8/2010 |
| EP | 0932117 | 7/1999 |
| EP | 1615109 A2 | 1/2006 |
| EP | 1980935 | 10/2008 |
| JP | 2007-264808 | 10/2007 |
| KR | 10-2008-0028852 | 4/2008 |
| WO | 2006/126310 | 11/2006 |

OTHER PUBLICATIONS

Non-Final Office Action issued on Jan. 26, 2012 in co-pending U.S. Appl. No. 12/625,213.
European Patent Office, Partial European Search Report for EP Application No. 09176928, Mar. 4, 2013.
Final Office Action dated Dec. 7, 2012 in U.S. Appl. No. 12/625,213.
Office Action issued in Chinese Application No. 200910225143.1, dated Jun. 19, 2013.
Extended European Search Report issued in European Application No. 09176928.1, dated May 28, 2013.
Final Office Action issued on Apr. 21, 2014 in U.S. Appl. No. 12/625,213.
Advisory Action dated Jul. 18, 2014, in U.S. Appl. No. 12/625,213.
Wang, et al., "Empirical Evaluation for Finger Input Properties in Multi-touch Interaction," In CHI 2009: Proceedings of 27th International Conference on Human Factors in Computing Systems, Apr. 7, 2009, pp. 1063-1072, ACM, Boston.
Notification of Preliminary Rejection dated Sep. 25, 2015, in Korean Patent Application No. 10-2009-0113076.
Non-Final Office Action dated Feb. 4, 2015, in U.S. Appl. No. 12/625,213.
Non-Final Office Action dated Mar. 28, 2016, in U.S. Appl. No. 12/625,213.
Notice of Allowance dated Jul. 31, 2015, in U.S. Appl. No. 12/625,213.
European Office Action dated Apr. 8, 2016, in European Patent Application No. 09 176 928.1.
Lazy evaluation, Wikipedia The Free Encyclopedia, Sep. 23, 2008, XP055262195, available at https://en.wikipedia.org/wiki/Lazy_evaluation.

* cited by examiner

FIG. 14
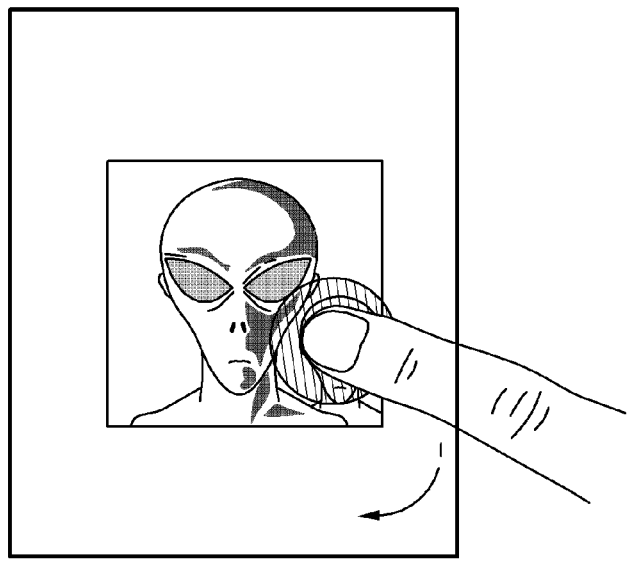
(a)
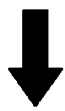
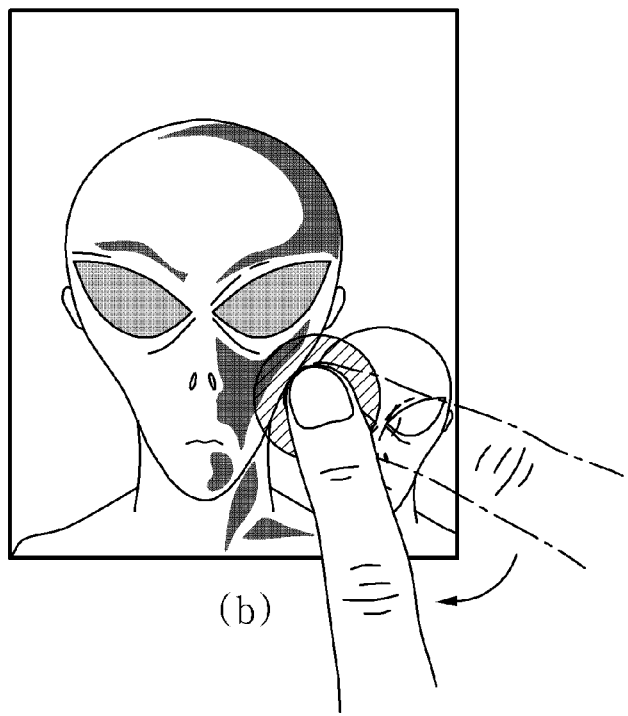
(b)

FIG. 15
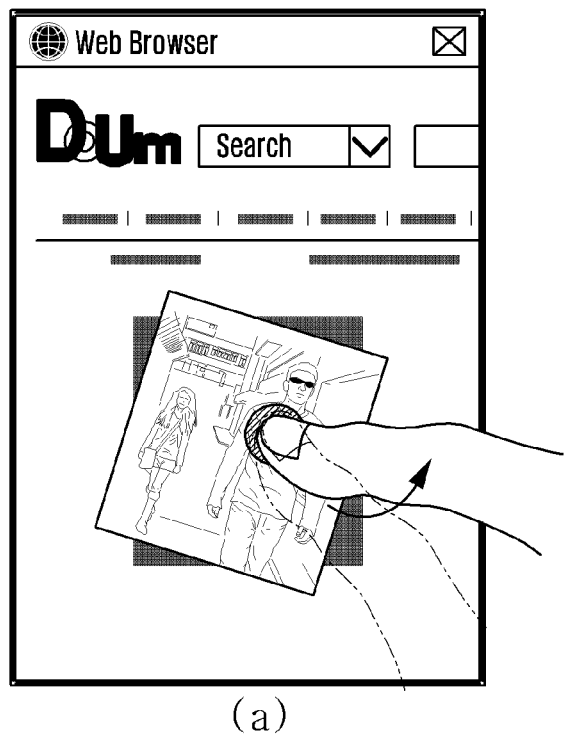
(a)
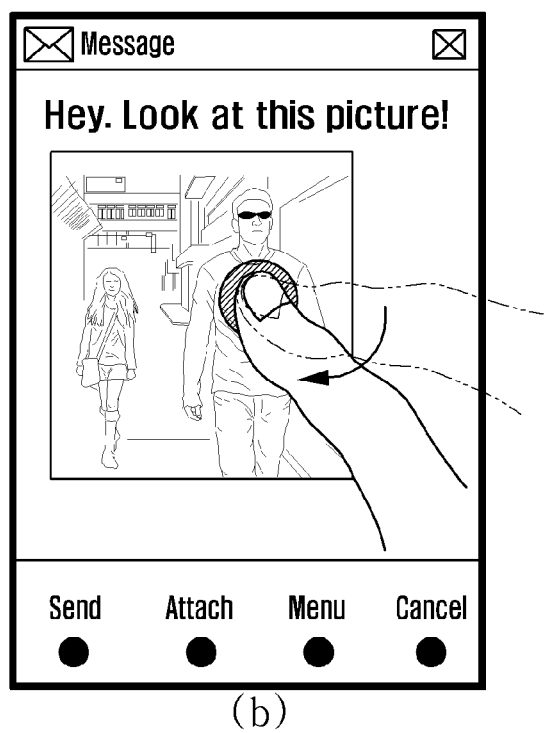
(b)

FIG. 16
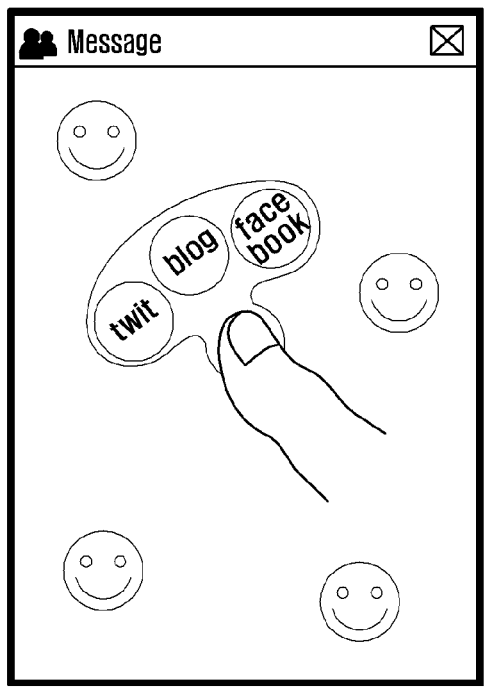
(a)
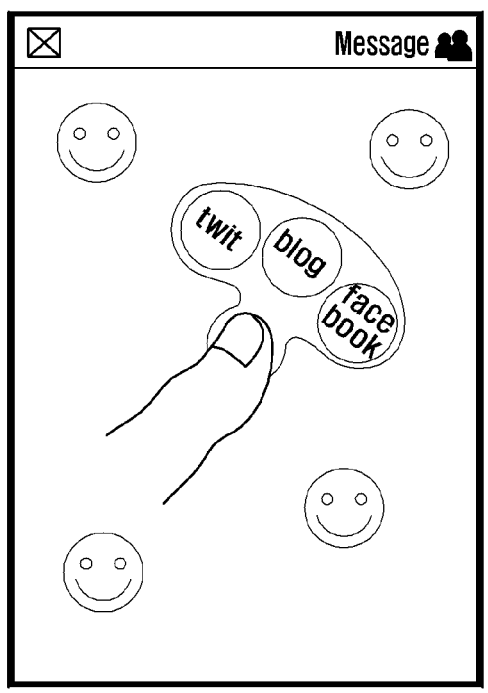
(b)

FIG. 17
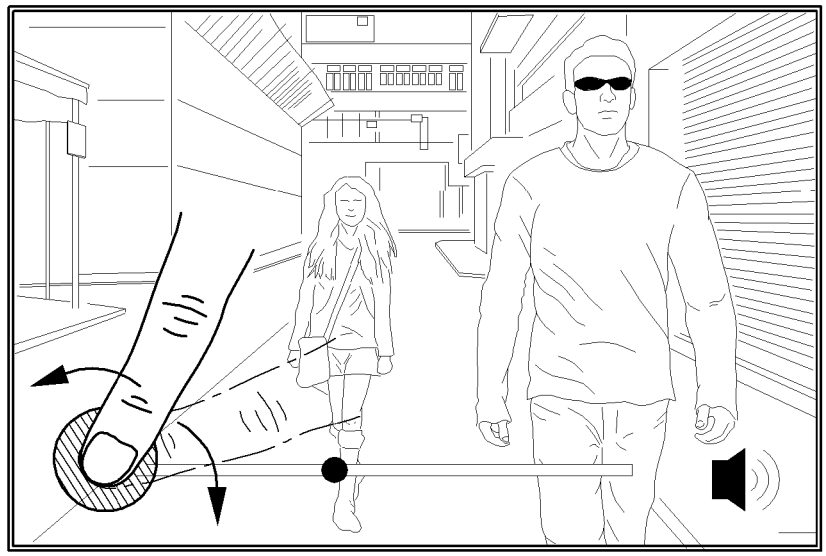
(a)
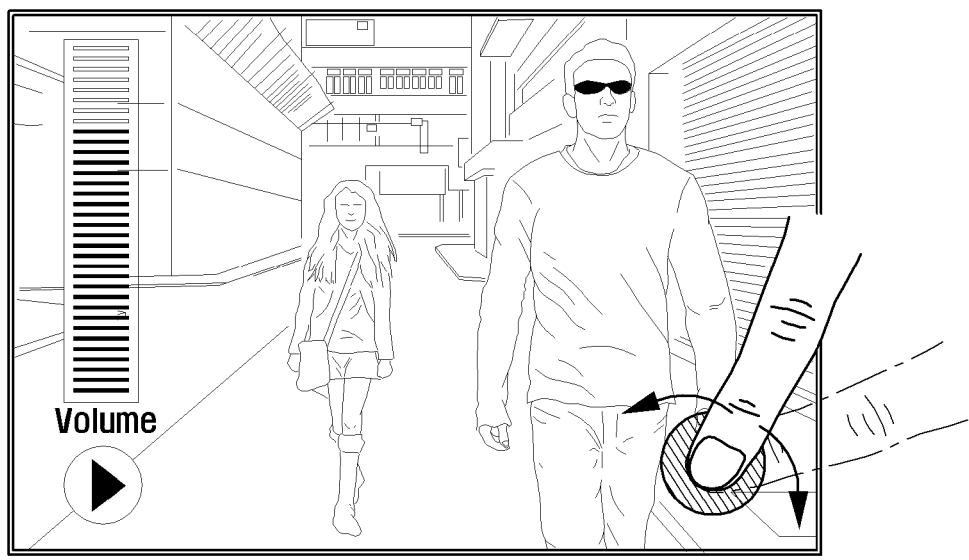
(B)

FIG. 18
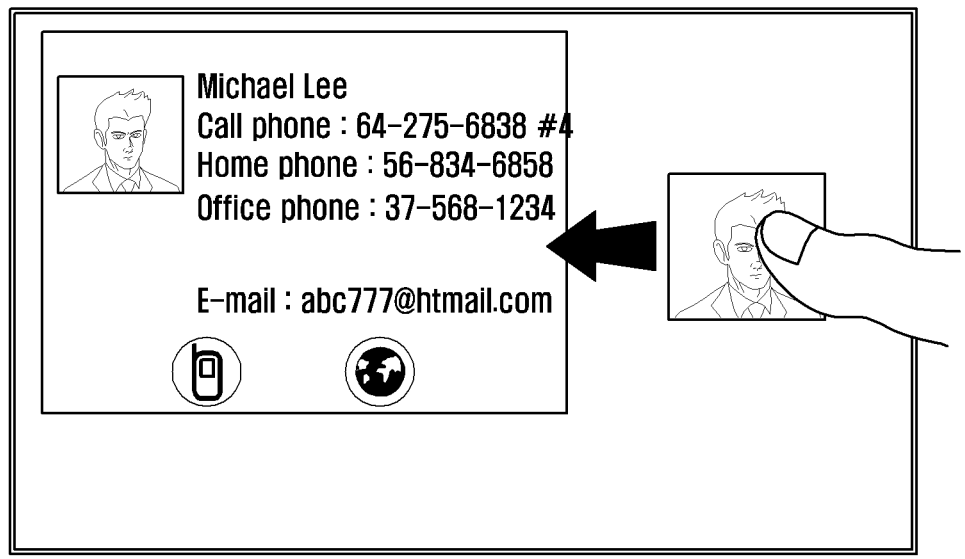
(a)
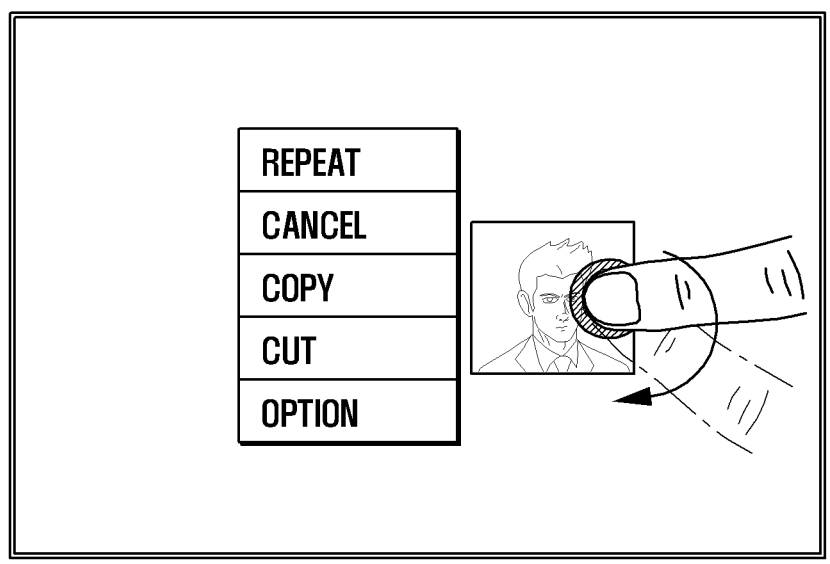
(B)

FIG. 19
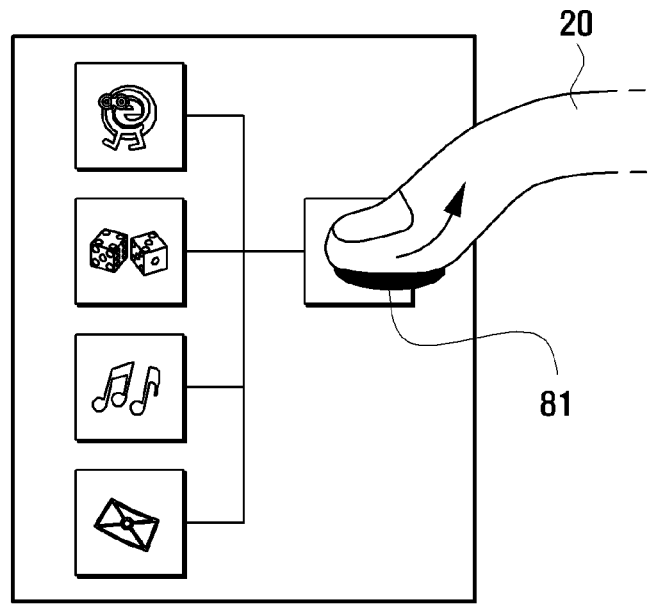
(a)
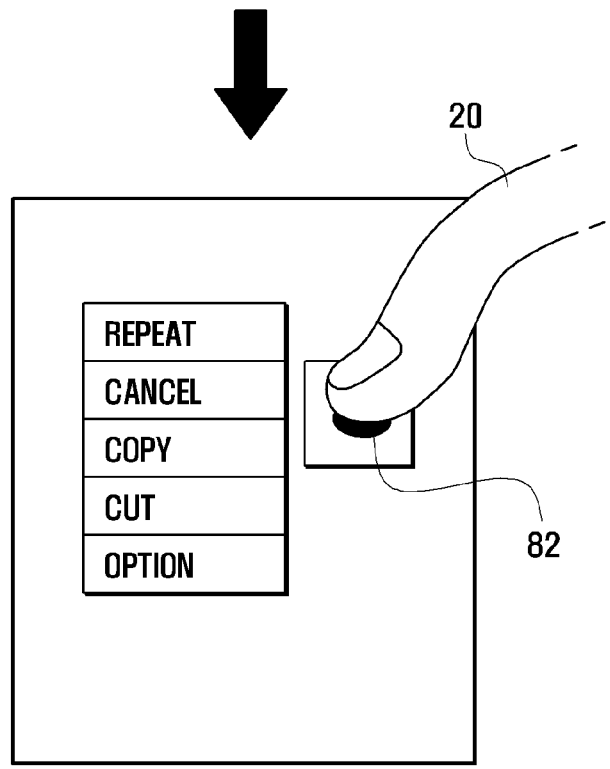
(B)

FIG. 22
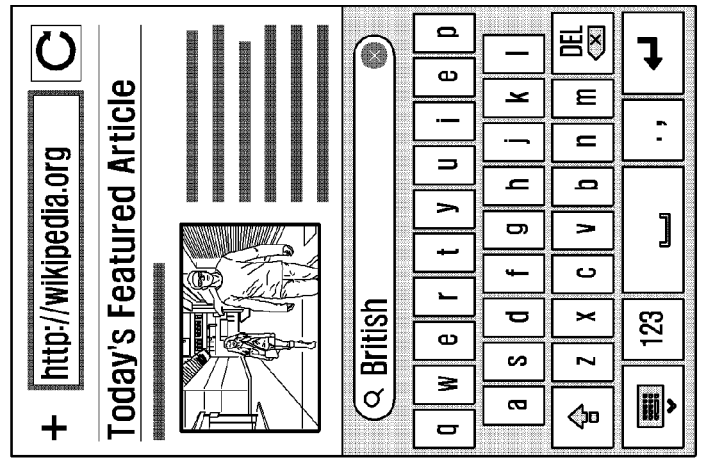
[c]
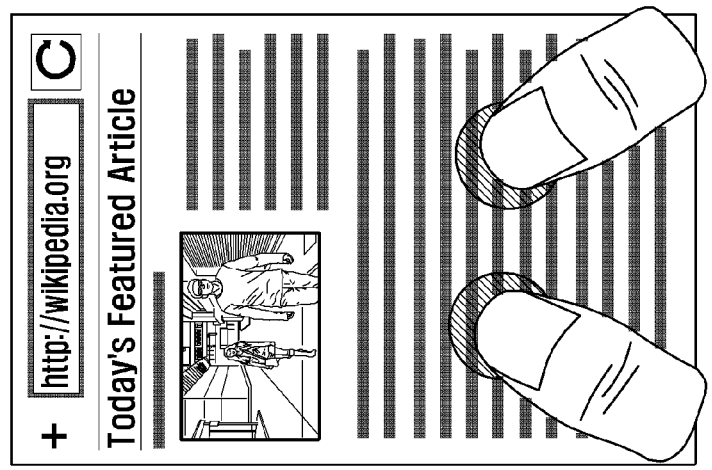
[b]
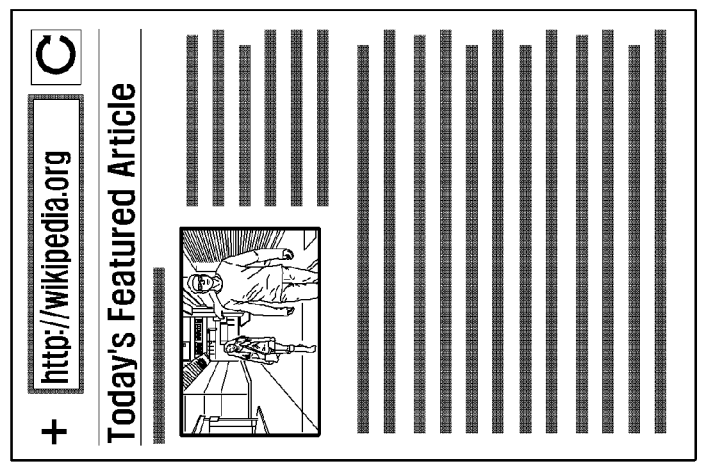
[a]

FIG. 28
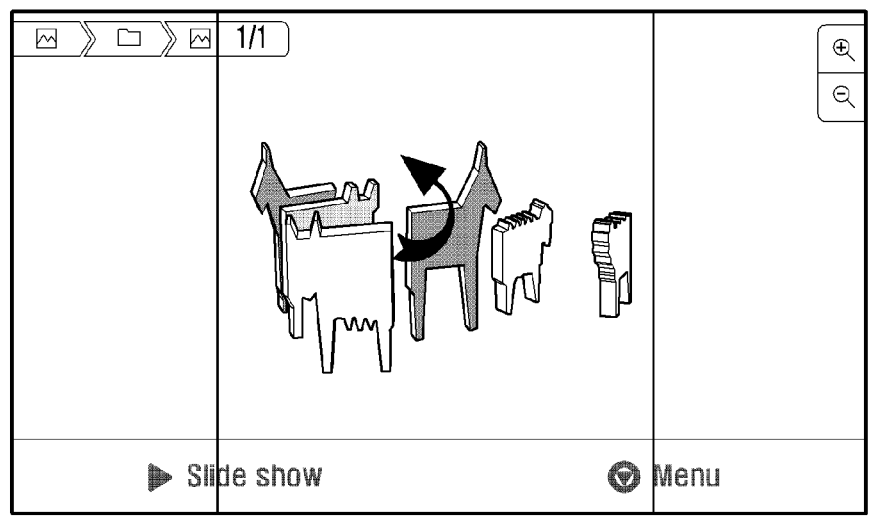
[a]
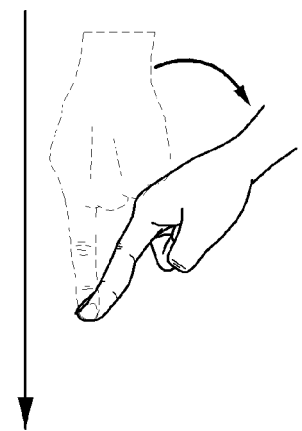
[b]
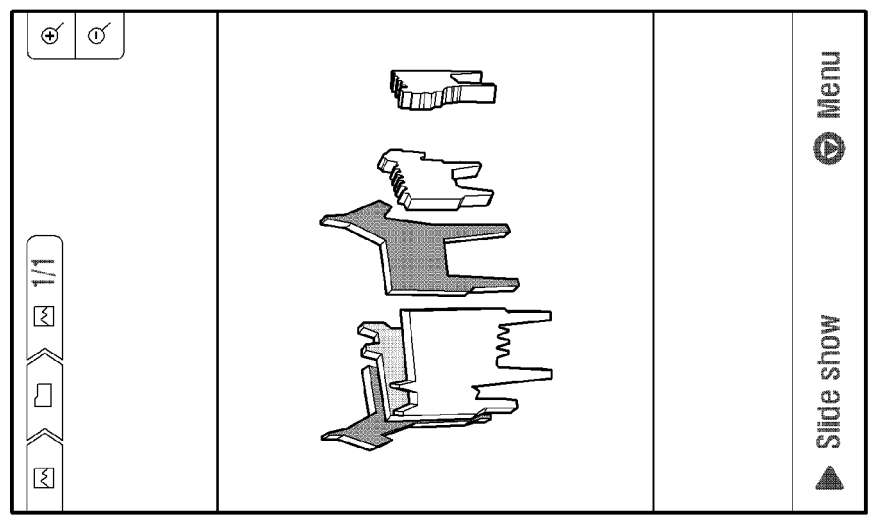

DEVICE AND METHOD FOR PROVIDING A USER INTERFACE

CROSS REFERENCE TO RELATED APPLICATIONS

This application is a continuation-in-part of U.S. patent application Ser. No. 12/625,213, filed on Nov. 24, 2009, and claims priority from and the benefit of Korean Patent Application No. 10-2008-0117358, filed on Nov. 25, 2008 and Korean Patent Application No. 10-2009-0113076, filed on Nov. 23, 2009. The contents of U.S. patent application Ser. No. 12/625,213, Korean Patent Application No. 10-2008-0117358, and Korean Patent Application No. 10-2009-0113076 are hereby incorporated by reference for all purposes as if fully set forth herein.

BACKGROUND OF THE INVENTION

1. Field of the Invention

The present invention relates to a device and method for providing a user interface, and a computer-readable recording medium recording a program for providing the user interface.

2. Description of the Background

With the development of sensor and software related technology, user interfaces in various electronic devices, such as a desktop computer, laptop computer, palmtop computer, personal digital assistant (PDA), portable multimedia player (PMP), and mobile phone, should preferably be user-friendly in use and design. User interfaces based on touch are widely used, and can execute an operation when a user touches a screen of a display device, thereby performing a corresponding function.

Conventional touch-based user interfaces, however, have a limitation in that, since a touched icon can execute only an instruction corresponding thereto, they do not allow for a variety of user's touch inputs.

SUMMARY OF THE INVENTION

Exemplary embodiments of the present invention provide a user-friendly user interface that can perform various inputs.

Exemplary embodiments of the present invention also provide an intelligent user interface that can quickly perform an input in a small-sized display unit.

Additional features of the invention will be set forth in the description which follows, and in part will be apparent from the description, or may be learned by practice of the invention.

Exemplary embodiments of the present invention disclose a device using information based on a touch finger type. The device includes a display unit, a sensor and a controller. The display unit displays at least one graphic user interface (GUI). The sensor generates a sensor signal according to a user's finger touch input. The controller receives the sensor signal from the sensor, identifies a touch area and an adjacent area based on the received sensor signal, generates touch finger shape-based information according to the identified touch area and the identified adjacent area, and controls the display unit to display the GUI according to the generated finger shape-based information.

Exemplary embodiments of the present invention disclose a method of providing a user interface using information based on a touch finger type. The method includes displaying at least one graphic user interface (GUI) on a screen, identifying, if a user's finger touch is input on the screen, a finger touch area and an adjacent area on the screen based on a sensor signal, generated by at least one sensor included in the display unit, generating touch finger shape-based information according to the identified touch area and the identified adjacent area, and changing and displaying the GUI according to the touch finger shape-based information.

Exemplary embodiments of the present invention disclose a computer-readable recording medium recording an executable program for providing a user interface. The program includes an instruction for displaying at least one graphic user interface (GUI) on a screen, an instruction for identifying, if a user's finger touch is input on the screen, a finger touch area and an adjacent area on the screen based on a sensor signal generated by a sensor, an instruction for generating touch finger shape-based information according to the identified touch area and the identified adjacent area, and an instruction changing and displaying the GUI according to the touch finger shape-based information.

Exemplary embodiments of the present invention disclose a device for providing a user interface. The device includes a display unit, a sensor, and a controller. The display unit displays a graphic user interface (GUI). The sensor generates a sensor signal in response to detecting an input. The controller receives the sensor signal from the sensor, determines a contact area based on the received sensor signal, generates touch shape-based information based on the determined contact area, and controls the display unit to display a GUI corresponding to the generated touch shape-based information.

Exemplary embodiments of the present invention disclose a method of providing a user interface. The method includes detecting an input, determining a contact area corresponding to the detected input, generating touch shape-based information based on the determined contact area, and displaying a graphic user interface (GUI) corresponding to the generated touch shape-based information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 14 illustrates a first example of an output screen of the device of FIG. 1 according to exemplary embodiments of the present invention.

FIG. 15 illustrates a second example of an output screen of the device of FIG. 1 according to exemplary embodiments of the present invention.

FIG. 16 illustrates a third example of an output screen of the device of FIG. 1 according to exemplary embodiments of the present invention.

FIG. 17 illustrates a fourth example of an output screen of the device of FIG. 1 according to exemplary embodiments of the present invention.

FIG. 18 illustrates a fifth example of an output screen of the device of FIG. 1 according to exemplary embodiments of the present invention.

FIG. 19 illustrates an example of an output screen of the device of FIG. 1 according to exemplary embodiments of the present invention.

FIG. 22 is a diagram illustrating an output screen of a user interface providing device using touch shape-based information according to exemplary embodiments of the present invention.

FIG. 28 is a diagram illustrating an output screen of a user interface providing device using touch shape-based information according to exemplary embodiments of the present invention.

DETAILED DESCRIPTION OF THE ILLUSTRATED EMBODIMENTS

Figure 1:
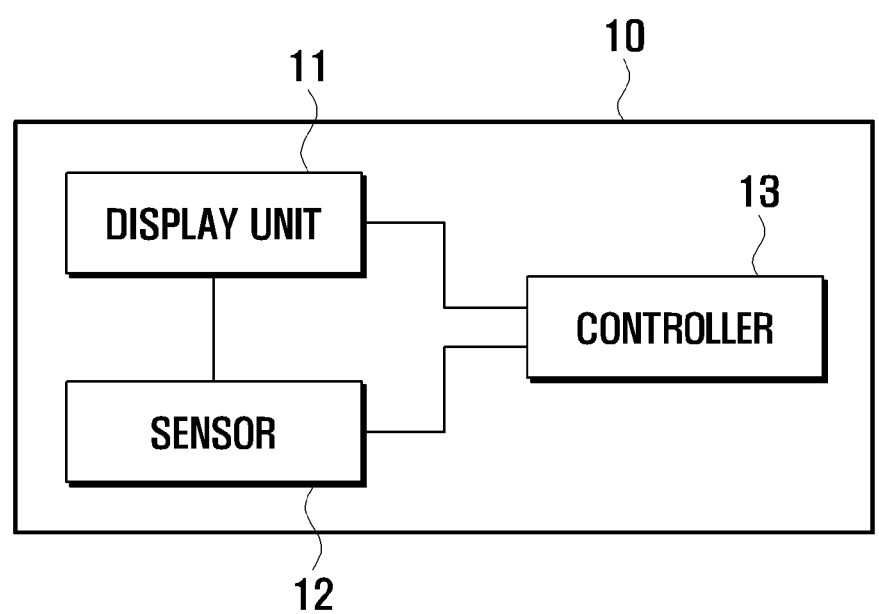
FIG. 1 is a block diagram illustrating a user interface providing device according to exemplary embodiments of the present invention.

In exemplary embodiments of the present invention, the term 'Graphic User Interface (GUI)' refers to a concept of graphics displayed on a screen of the display unit. GUI includes graphic objects that can be displayed on a screen, such as icons, items, thumbnails, full screen images, etc. GUI also includes a screen composed of the graphic objects.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, for convenience of description, a target for performing a function by a finger touch action is referred to as an icon. However, in order to easily designate various programs, instructions, or data files, a small picture or symbol corresponding to the various programs, instruction, or data files may be formed and displayed on a screen. When a picture or an image is searched for, the icon may include a thumbnail represented by reducing a representative size of the picture or the image. A target, such as a picture or an image, displayed on a screen may perform a predetermined operation when the user provides a touch action. That is, the icon may be used as a concept replacing the GUI.

Hereinafter, exemplary embodiments of the present invention are described in detail with reference to the accompanying drawings.

FIG. 1 is a block diagram illustrating a user interface providing device using information based on a type of a finger (hereinafter 'finger type') according to exemplary embodiments of the present invention.

A user interface providing device 10 may include a display unit 11, a sensor 12, and a controller 13.

The display unit 11 may display an icon corresponding to at least one instruction executable by a touch of a finger (hereinafter 'touch action'). The sensor 12 may obtain a sensor signal of a touch action occurred in the display unit 11, and may output it to the controller 13. In an embodiment of the present invention, the sensor 12 may be an optical sensor or a touch sensor. The sensor 12 may be configured to contact the display unit 11 and may be formed as layers. The sensor 12 may be an optical detecting sensor having an infrared ray light emitting diode (LED) and a phototransistor disposed in a matrix form opposite to each other, and in which a finger image is obtained by emitting and receiving infrared rays. When a touch action occurs, the optical sensor estimates an amount of light reflected from the finger, i.e., an amount of reflected light. The estimated amount of reflected light may serve as data to identify a touch area and an adjacent area. The optical sensor performs a detecting operation in such a way that, when a touch action occurs on a screen, it estimates an image of a touch object through a photodiode and detects an effective touch area where the touch object actually contacts on the screen. The effective touch area is converted to a digital image. The digital image is analyzed for the coordinates of the effective touch area, thereby identifying the touched location. Therefore, the touched location makes it possible to perform a variety of functions related to an icon corresponding thereto.

In an embodiment of the present invention, the sensor 12 is implemented with a touch sensor. In that case, it is preferable that the touch sensor is a capacitive touch sensor. The touch sensor performs a detecting operation as follows. When a touch action occurs on a screen, charges are lost from a touched portion on the screen, i.e., current flows thereon. The touch sensor detects the location where charges are lost and the amount of lost charges, and then identifies a touch area and an adjacent area.

In an embodiment of the present invention, the sensor 12 may be a combination of an optical sensor and a touch sensor. In that case, the touch sensor may be a capacitive touch sensor or a resistive touch sensor. The sensor 12 may generate a sensor signal by sensing a touch action and obtaining an image of the touch area. The sensor signal may serve as data to identify a touch area and an adjacent area.

In an embodiment of the present invention, the sensor 12 may further include an A/D converter for converting an analog signal to a digital signal.

When a user's finger touches a screen, the sensor 12, for example, an optical sensor, estimates an amount of reflected light. The sensor 12 generates a sensor signal containing information regarding the amount of reflected light and outputs it to the controller 13. That is, the sensor 12 obtains an image of the finger based on the estimated amount of reflected light, generates a sensor signal containing the obtained finger image, and then outputs it to the controller 13. If the sensor 12 is implemented with a touch sensor, it detects the change in charge lost from the screen (the amount of lost charge), generates a sensor signal containing information regarding the amount of lost charge, and then outputs it to the controller 13.

Figure 2:
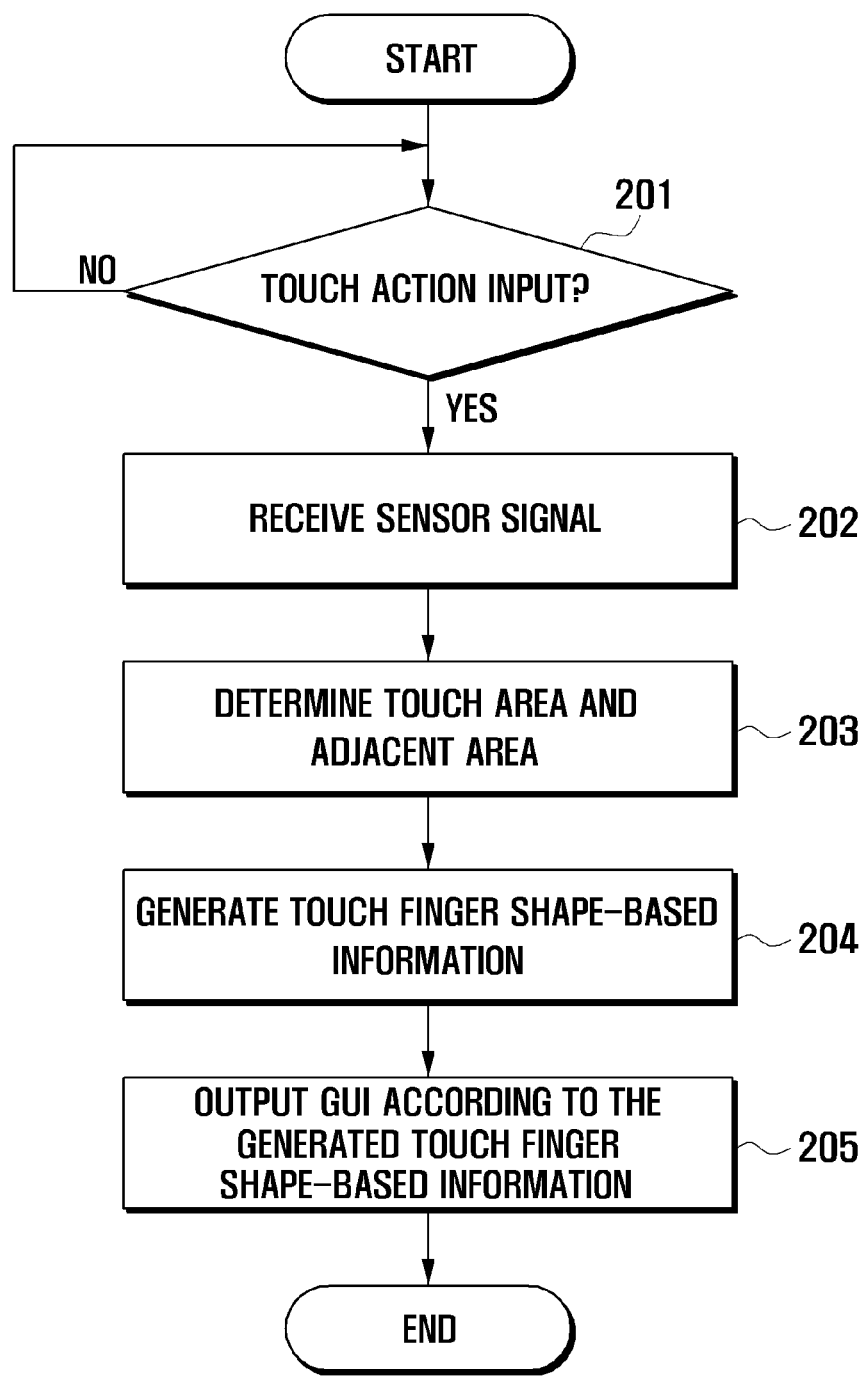
FIG. 2 is a flowchart that describes a method for providing a user interface according to exemplary embodiments of the present invention.

A description is provided regarding the controller 13 with reference to FIG. 2.

FIG. 2 is a flow chart that describes a method for providing a user interface according to an exemplary embodiment of the present invention. In an embodiment of the present invention, it is assumed that the controller 13 controls the display unit 11 to display at least one GUI.

The controller 13 controls the sensor 12 and determines whether a user's touch action occurs on a screen (201). If the sensor 12 detects a user's touch action on a screen at 201, it generates a sensor signal and outputs it to the controller 13 (202). For example, if the sensor 12 is implemented with an optical sensor, the sensor signal contains information regarding an amount of reflected light. If the sensor 12 is implemented with a touch sensor, the sensor signal contains information regarding the change in charges lost on the screen (i.e., an amount of lost charge).

When the controller 13 receives the sensor signal from the sensor 12 at 202, it identifies a finger touch area and an adjacent area (203).

For example, if the sensor 12 is implemented with an optical sensor, light reflection occurs primarily in an area on the screen where the finger contacts, which is called a touch area, and also occurs relatively small in an area that is adjacent to the touch area but is not directly touched by the user's finger, which is called an adjacent area. The controller 13 identifies that the area where the amount of reflected light is primarily distributed is a finger touch area. Similarly, it also identifies that the area where the amount of reflected light is less distributed than that of the finger touch area is a finger adjacent area. That is, the controller 13 can identify the touch area and the adjacent area according to the comparison an amount of light reflected from an area on the screen with a preset amount of light as a reference value. If the amount of light reflected from an area is equal to or greater than the present amount of light, the controller 13 concludes that the area is a touch area. On the other hand, if the amount of light reflected from an area is less than the present amount of light, the controller 13 concludes that the area is an adjacent area. In an embodiment of the present invention, as a first reference amount of light and a second reference amount of light are preset, the controller 13 can identify an area as a touch area if an amount of reflected light in the area is equal to or greater than the first reference amount of light. The controller 13 can also identify an area as an adjacent area if an amount of reflected light in the area is less than the first reference amount of light but equal to or greater than the second reference amount of reflected light. Otherwise, that is, if an amount of reflected light in an area is less than the second reference amount of light, the controller 13 can identify the area as an open area.

Alternatively, if the sensor 12 is implemented with a touch sensor, it detects an amount of lost charges on the screen. The amount of lost charges is large in an area where the user's finger touches on the screen, which is called a touch area. On the other hand, the amount of lost charges is relatively small in an area that is adjacent to the touch area but is not touched by the user's finger, which is called an adjacent area. The controller 13 identifies that the area where the amount of lost charges is large is a finger touch area. Similarly, it also identifies that the area where the amount of lost charges is less than that of the finger touch area is a finger adjacent area. That is, the controller 13 can identify the touch area and the adjacent area according to the comparison an amount of lost charges in an area on the screen with a preset amount of charges as a reference value. If the amount of lost charges in an area is equal to or greater than the present amount of charges, the controller 13 concludes that the area is a touch area. On the other hand, if the amount of lost charges in an area is less than the present amount of charges, the controller 13 concludes that the area is an adjacent area. In an embodiment of the present invention, as a first reference amount of charges and a second reference amount of charges are preset, the controller 13 can identify an area as a touch area if an amount of charges lost in the area is equal to or greater than the first reference amount of charges. The controller 13 can also identify an area as an adjacent area if an amount of charges lost in the area is less than the first reference amount of charges but equal to or greater than the second reference amount of charges. Otherwise, that is, if an amount of charges lost in an area is less than the second reference amount of charges, the controller 13 can identify the area as an open area.

The controller 13 generates finger type based information according to the identified touch area and the identified adjacent area (204). In an embodiment of the present invention, the finger type based information includes a location of the user's finger, a touch form of the touch finger, and a type of the touch finger. The controller 13 detects a direction vector of the touch finger based on the touch area and the adjacent area. The controller 13 also obtains an angle of the direction vector, and estimates and generates a location of the user's finger based on the angle of the direction vector. The controller 13 can estimate a horizontal length and a vertical length of the touch area, and generate information regarding the touch area by determining a size of the touch area according to the horizontal and vertical lengths. Alternatively, the controller 13 detects a direction vector of the touch finger based on the touch area and the adjacent area. The controller 13 also obtains an angle of the direction vector, and generates the touch finger type information by determining whether the touch finger is a right hand finger or a left hand finger according to the angle of the direction vector.

The controller 13 controls the display unit 11 to change and display the GUI based on the generated finger type based information (205). In an embodiment of the present invention, the controller 13 can execute a rotation, movement or enlargement of the GUI on the display unit 11.

Figure 3A:
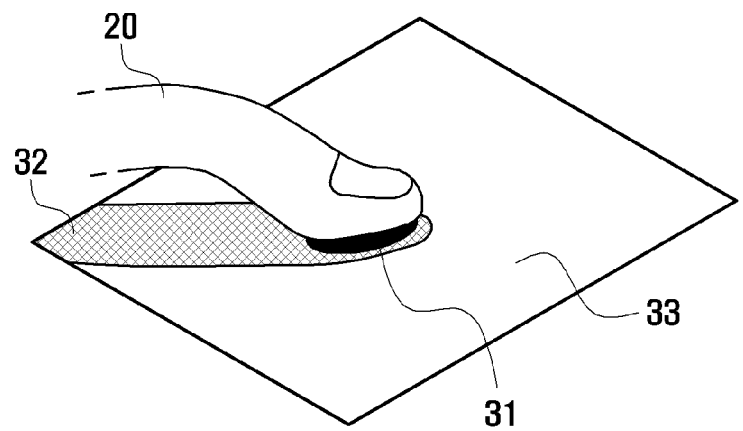
FIG. 3A is a perspective view illustrating a finger touch action in the device of FIG. 1 according to exemplary embodiments of the present invention.
Figure 3B:
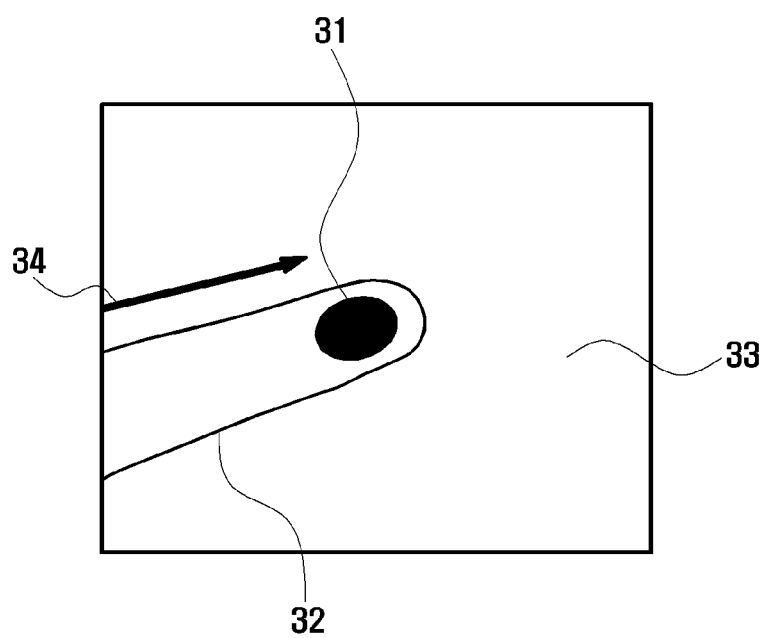
FIG. 3B illustrates a finger image of the finger touch action of FIG. 3A according to exemplary embodiments of the present invention.

FIG. 3A is a perspective view illustrating a finger touch action in the device 10 of FIG. 1, and FIG. 3B illustrates a finger image of the finger touch action of FIG. 3A.

Referring to FIG. 3A and FIG. 3B, when a finger touch action is performed, by a touching finger 20, on a screen, the sensor 12 generates a sensor signal. If the sensor is implemented with an optical sensor, the sensor 12 may obtain a finger image of the touching finger 20. The finger image may be obtained using different contrasts to distinguish between a portion of the finger touching the screen and a portion of the finger not touching the screen.

The controller 13 may detect a finger touch area 31 and an adjacent area 32 based on the sensor signal, where the finger touch area 31 refers to an area where the finger 20 touches the screen and the adjacent area 32 refers to an area that is located on the screen but where the finger 20 does not touch the screen. The controller 13 can also identify an open area 33 that is not the finger touch area 31 and the adjacent area 32. The controller 13 may then generate information associated with the user's location, and a finger type of a touching portion of the finger 20. The controller 13 can detect a direction vector 34 based on the finger touch area 31 and the adjacent area 32. The controller 13 may then determine whether a left hand or right hand is being used. In an embodiment of the present invention, the controller 13 may also detect and determine a touched icon based on the finger touch area 31. When executing an instruction corresponding to the determined icon, the controller 13 may execute the instruction according to the generated information based on the finger type.

Figure 4:
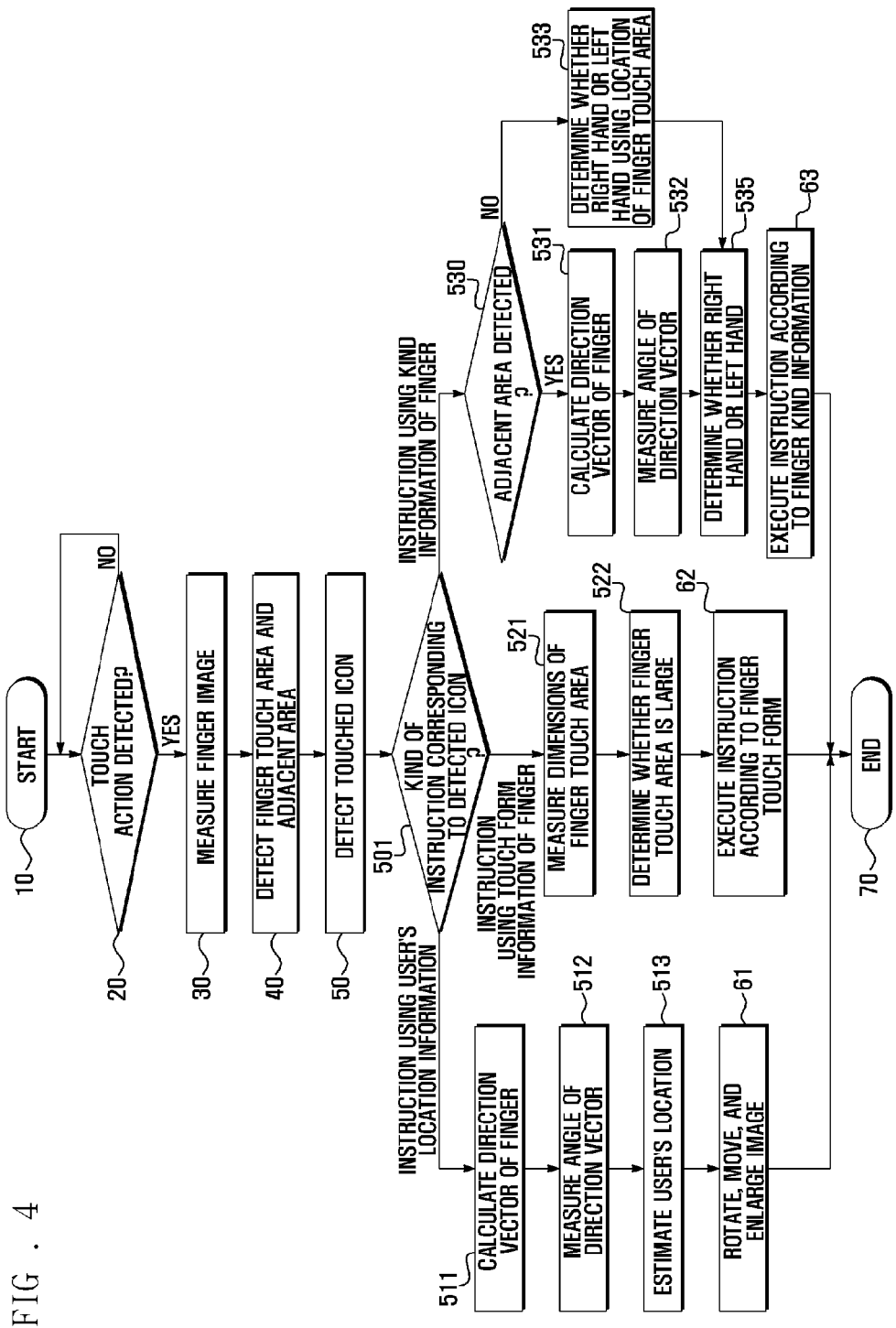
FIG. 4 is a flowchart illustrating a method of providing a user interface using information based on a finger type according to exemplary embodiments of the present invention.

FIG. 4 is a flowchart illustrating a method of providing a user interface using information based on a finger type if the sensor 12 is implemented with an optical sensor, according to exemplary embodiments of the present invention.

Referring to FIG. 4, the controller 13 may determine whether a touch action of the finger 20 is detected by the optical sensor 12 in the display unit 11 (20).

If a touch action of the finger 20 is detected, the optical sensor 12 may obtain an image of the entire finger 20 that touches the display unit 11 (30).

The controller 13 may then determine the finger touch area 31 and the adjacent area 32 based on the image of the entire finger 20 obtained by the optical sensor 12 (40).

The controller 13 may then determine an icon displayed in the display unit 11 to be a touched icon by analyzing a coordinate of the finger touch area 31 (50).

The controller 13 may determine what type of an instruction is related to the determined icon (501). The controller 13 may generate information based on a finger type based on the determined finger touch area 31 and the adjacent area 32 according to the determined instruction.

If the instruction related to the determined icon is an instruction using the user's location information, the controller 13 may calculate a direction vector 34 of the finger 20 in the finger touch area 31 and the adjacent area 32 (511). Specifically, the controller 13 may calculate a direction vector 34 of the finger 20 from the adjacent area 32 towards the finger touch area 31 (see FIG. 3B). The controller 13 may determine an angle of the direction vector 34 (512). The angle of the direction vector 34 may range from 0° to 360°. 0° may be a horizontal axis situated from the left side to the right side of the display unit 11.

The controller 13 may estimate a user's location using, for example, a reference to TABLE 1 and may generate a user's location information accordingly (513). TABLE 1 may be stored in or provided to the device 10 using any suitable means.

TABLE 1

| Angle of Direction Vector | User's Location Information |
| --- | --- |
| 45° to 135° | Lower part of display unit |
| above 135° to 225° | Right side of display unit |
| above 225° to 315° | Upper part of display unit |
| above 315° to 45° | Left side of display unit |

As shown in TABLE 1, if an angle of the direction vector 33 of the finger 20 is in a range of 45° to 135°, the user's location information may refer to a lower part of the display unit 11. If an angle of the direction vector 33 of the finger 20 is in the above 135° to 225° range, the user's location information may refer to a right side of the display unit 11. If an angle of the direction vector 33 of the finger 20 is in the above 225° to 315° range, the user's location information may refer to an upper part of the display unit 11. If an angle of the direction vector 33 of the finger 20 is in the above 315° to 45° range, the user's location information may refer to a left side of the display unit 11.

The controller 13 executes a rotation, movement, and enlargement of an image corresponding to the determined icon according to the user's location information generated in step 513 (61). For example, if the user's location information refers to the lower part of the display unit 11, the controller 13 may, in some cases, rotate an image corresponding to the determined icon relative to the user's position towards a lower part of the display unit 11. The controller 13 may also move the image towards the lower part of the display unit 11, and/or may enlarge and display the image in the lower part of the display unit 11.

If the instruction corresponding to the determined icon is an instruction using a touch form of a finger, the controller 13 may determine a horizontal length (a) and a vertical length (b) of the finger touch area 31 (521). A ratio (c) of the vertical length (b) to the horizontal length (a) may be calculated using Equation 1.

$$c = b/a \quad \text{[Equation 1]}$$

The controller 13 may determines whether the finger touch area 31 is large or small according to the calculated value c. For example, as shown in TABLE 2, if c is greater than 1, the finger touch area 31 may be determined to be large, or if c is less than 1, the finger touch area may be determined to be small. Accordingly, the controller 13 may generate finger touch form information corresponding to the calculated value of c (522). TABLE 2 may be stored in or provided to the device 10 using any suitable means.

TABLE 2

| C | Finger Touch Area |
|---|---|
| b/a ≥ 1 | Large |
| b/a < 1 | Small |

The controller 13 may execute an instruction related to the determined icon according to the generated finger touch form (62). For example, when an icon is a menu bar, if the finger touch area 31 is 'large,' lower-level menus may be displayed, and if the finger touch area 31 is 'small,' upper-level menus may be displayed.

If the instruction related to the determined icon is an instruction using finger type information, the controller 13 may determine whether the adjacent area 32 is determined (530). If the adjacent area 32 is determined, the controller 13 may calculate a direction vector 34 of the finger 20 from the adjacent area 32 towards the finger touch area 31 (531).

The controller 13 may then determine an angle of the direction vector 34 (532).

When different instructions are executed according to the finger type, an input action may quickly be performed and generally in a mobile terminal in which the display unit has a relatively small size. Therefore a portable terminal user may generally be assumed to be positioned at a lower part of the display unit 11. An angle of the direction vector 33 may be in a range of 0° to 180°.

The controller 13 may determine whether a touching hand is a right hand or a left hand based on the determined angle of the direction vector 33 using, for example, a reference to TABLE 3, and may generate the finger type information accordingly (535). TABLE 3 may be stored in or provided to the device 10 using any suitable means.

TABLE 3

| Vector angle | Finger Type Information |
|---|---|
| 0° to 90° | left hand |
| 90° to 180° | right hand |

In TABLE 3, if an angle of the direction vector 33 is in a range of 0° to 90°, the type of finger 20 may be a left hand finger. If an angle of the direction vector 33 is in a range of 90° to 180°, the type of finger 20 may be a right hand finger.

If the adjacent area 32 is not determined at step 530, the controller 13 may determine whether a location of the finger touch area 31 is the right side or the left side of the display unit 11, and may generate the finger type information (533).

For example, if a location of the finger touch area 31 is the left side of the display unit 11, the finger 20 may be determined to be a left hand finger. If a location of the finger touch area 31 is the right side, the finger 20 may be determined to be a right hand finger.

After determining whether the finger 20 is a right hand finger or a left hand finger at step 533 or step 535, the controller 13 may execute an instruction related to the determined icon according to the generated finger type information (63). For example, when an icon is a numeral key, and the type of finger 20 is a right hand finger, a right side character may be input. If the type of finger 20 is a left hand finger, a left side character may be input.

Therefore, various instructions can be executed based on the generated information according to the type of instruction corresponding to a touched icon. Hereinafter, examples of instruction execution are provided.

Embodiment 1

Figure 5:
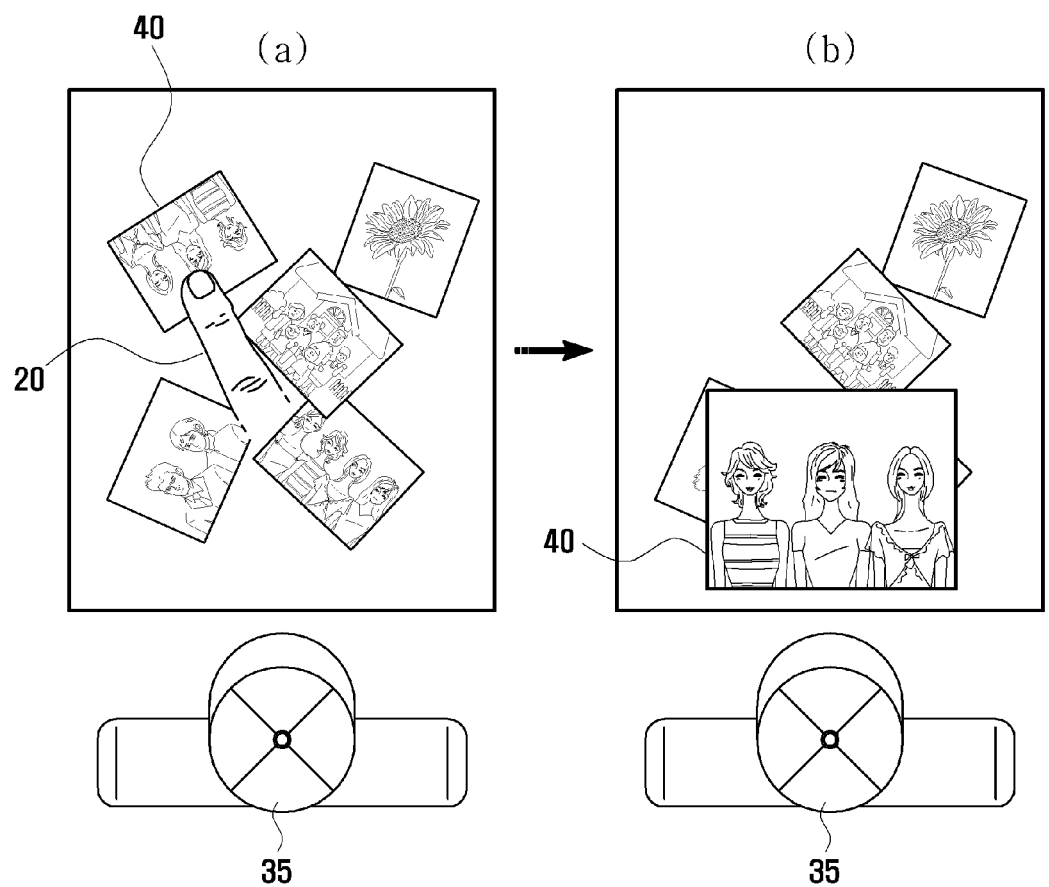
FIG. 5 illustrates a first example of instruction execution in the device of FIG. 1 according to exemplary embodiments of the present invention.

FIG. 5 illustrates a first example of instruction execution in the device of FIG. 1. In FIG. 5, a picture corresponding to a touched icon is displayed by rotating, moving, and enlarging the picture. The picture may then be situated at a location in the display unit 11 corresponding to the user's position.

As shown in FIG. 5(*a*), pictures may be displayed in a reduced thumbnail form and icons may be randomly arranged. When a user 35 touches an icon 40 in the display unit 11, the controller 13 may calculate the direction vector 33 of a finger image of the finger 20, measure a vector angle, and estimate a location of the user 35. In FIG. 5(*a*), the direction vector 33 of the finger 20 is in a range of 45° to 135°, hence a location of the user 35 may be determined to correspond to a lower part of the display unit 11. When the controller 13 determines the location of the user 35 with information based on a finger direction, a picture corresponding to the touched icon 40 may be rotated, moved, enlarged, and displayed to correspond to the location of the user 35, as shown in FIG. 5(*b*).

In a conventional touch user interface, when such an instruction is performed, an icon must be selected, dragged to a user's location, and rotated by the user, whereas, according to exemplary embodiments of the present invention, such actions are executed by a single touch action of an icon. Further, according to exemplary embodiments of the present invention, because a user's location is used as information based on a finger type, the present exemplary embodiment is useful when many users perform a touch action in a display unit.

Figure 6:
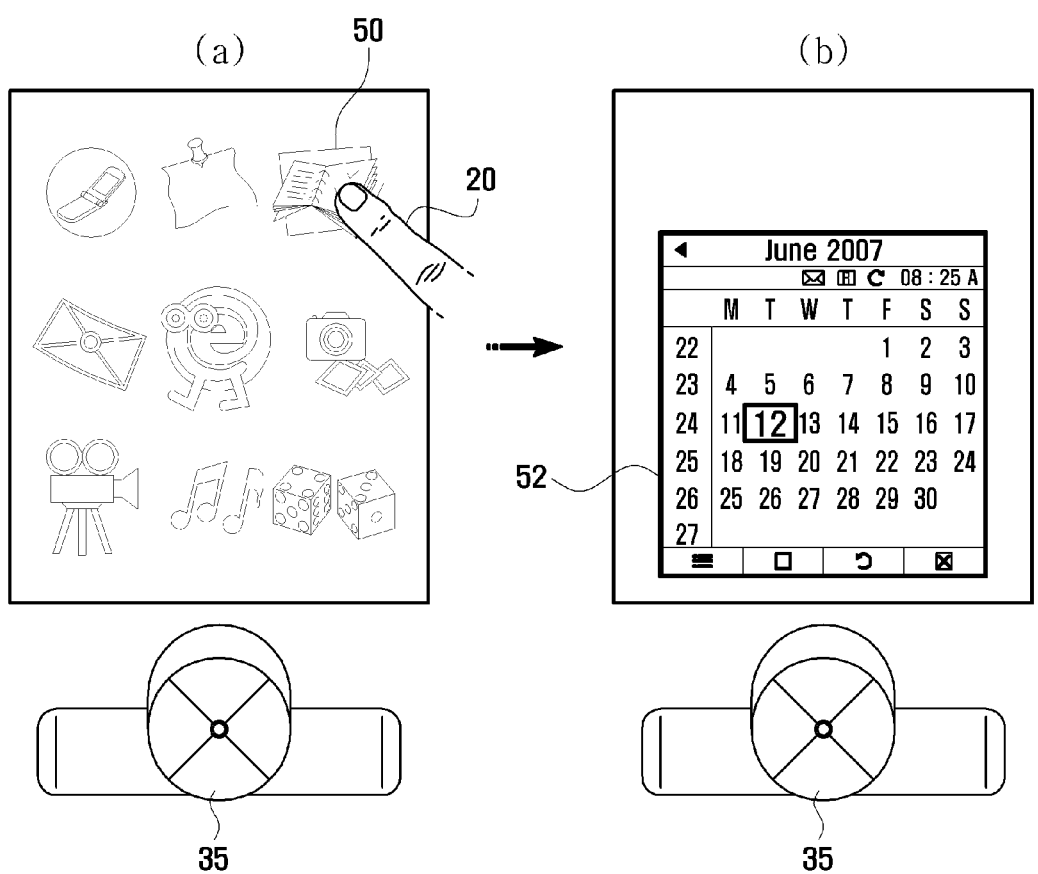
FIG. 6 illustrates a second example of instruction execution in the device of FIG. 1 according to exemplary embodiments of the present invention.

FIG. 6 illustrates a second example of instruction execution in the device of FIG. 1. In FIG. 6, the icons displayed in the first example of FIG. 5 may form a menu of function options.

As shown in FIG. 6(*a*), when the user 35 touches an icon 50 representing, for example, a schedule from a plurality of icons representing function options, the controller 13 may enlarge and display a calendar 52 for managing a schedule to correspond to the determined user location.

Figure 7:
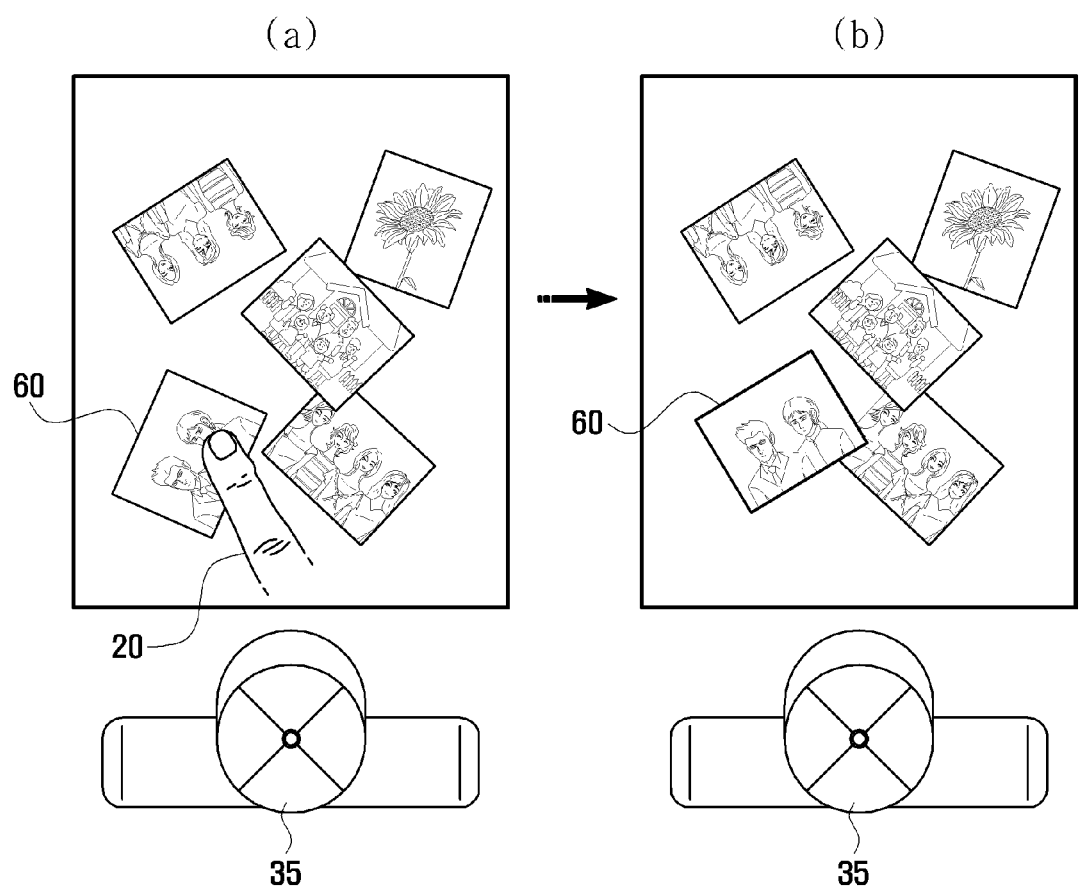
FIG. 7 illustrates a third example of instruction execution in the device of FIG. 1 according to exemplary embodiments of the present invention.

FIG. 7 illustrates a third example of instruction execution in the device of FIG. 1. In FIG. 7, a picture corresponding to a touched icon is displayed by rotating the picture to correspond to the user's position.

As shown in FIG. 7(*a*), when the user 35 touches an icon 60, the controller 13 may rotate and display the icon 60 according to the user's location information determined by the controller 13, as shown in FIG. 7(*b*). However, in FIG. 7, the user's location may be determined by the controller 13 according to the specific direction vector of the detected finger 20, irrespective of whether the direction vector corresponds to the right side, left side, upper side, or lower side of the display unit 11, as in the first example. Therefore, the user's location may be a starting point of the direction vector of the finger 20, and the icon 60 may be rotated to correspond to the user's location (i.e., to the vector direction).

Figure 8:
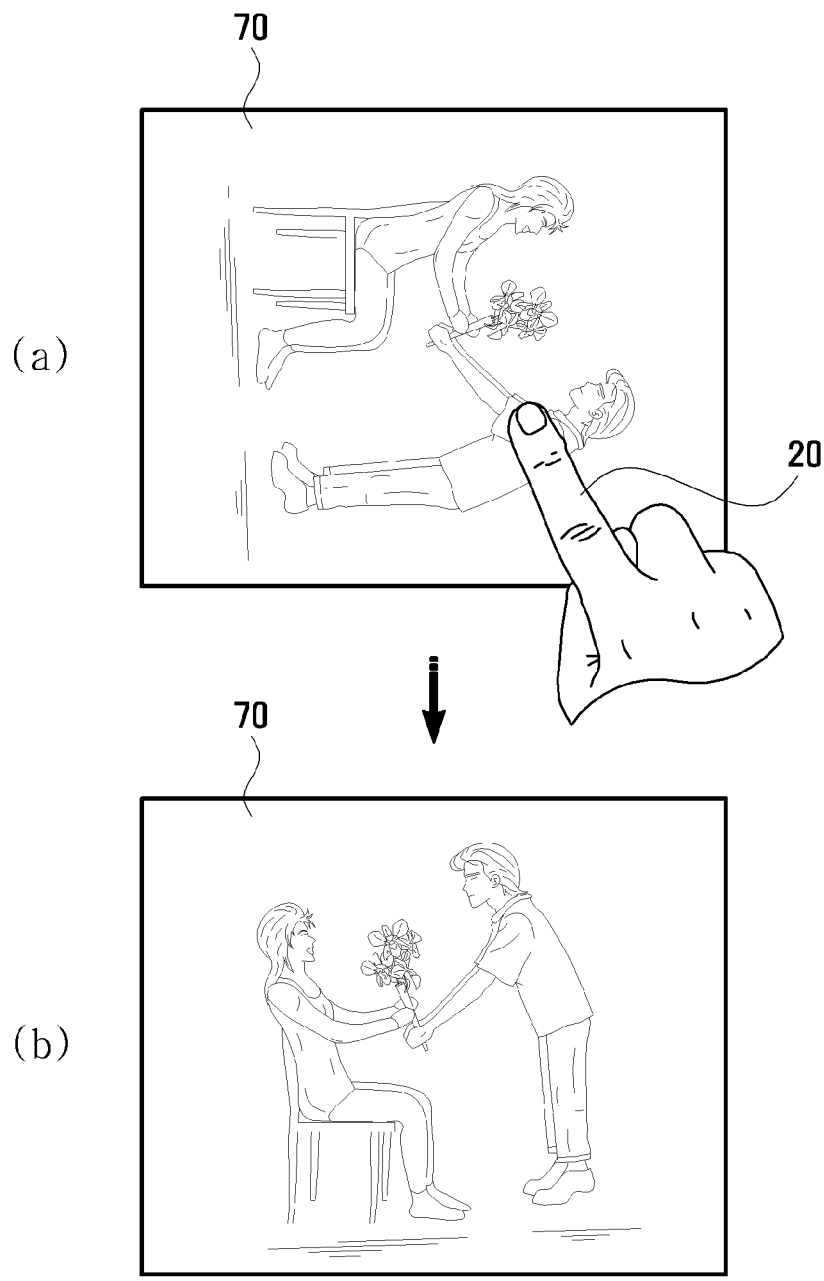
FIG. 8 illustrates a fourth example of instruction execution in the device of FIG. 1 according to exemplary embodiments of the present invention.

FIG. 8 illustrates a fourth example of instruction execution in the device of FIG. 1. In FIG. 8, a screen displayed in a predetermined orientation in the display unit 11 rotates to correspond to the user's location.

In FIG. 8(*a*), a screen 70 may initially be displayed to correspond to a user positioned towards the left side of the display unit 11. When a touch action is performed by the finger 20 of a user positioned towards a lower part of the display unit 11, as shown in FIG. 8(*a*), the controller 13 may generate information of the user's location and, as shown in FIG. 8(*b*), the controller 13 may rotate and display the screen 70 to correspond to the user positioned towards the lower part of the display unit 11.

Embodiment 2

Figure 9:
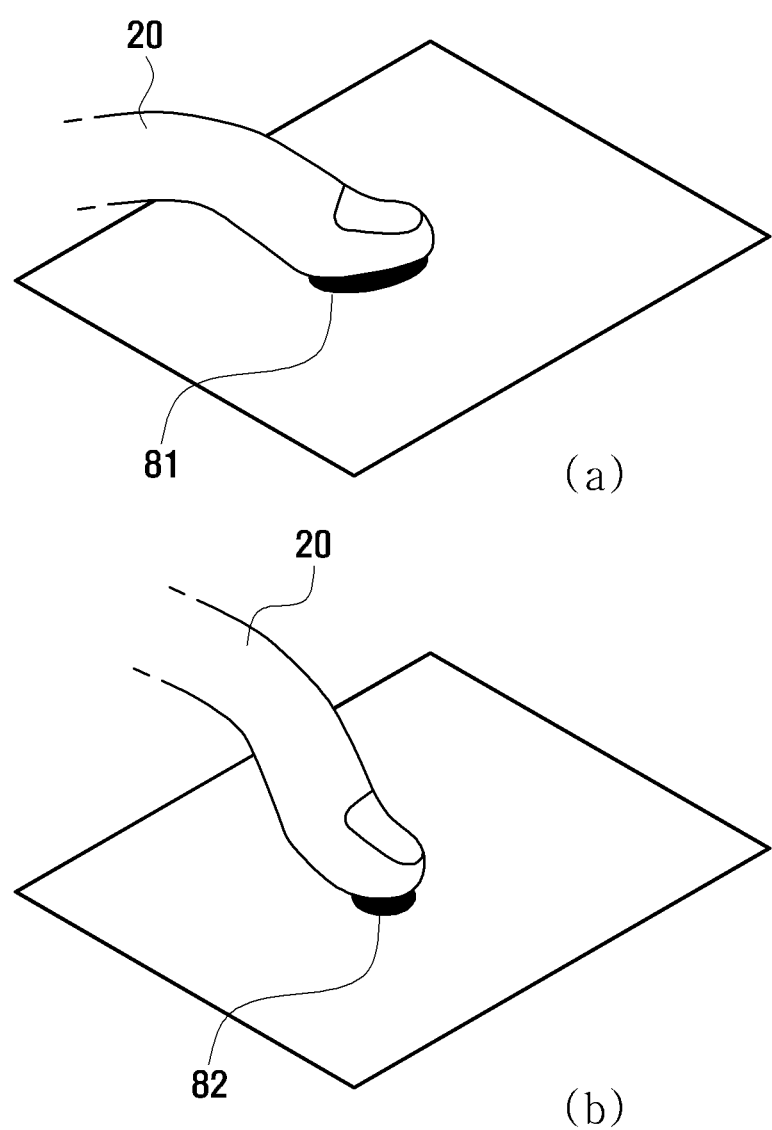
FIG. 9 is a perspective view illustrating a finger touch action in a user interface providing device using information based on a finger type according to exemplary embodiments of the present invention.

FIG. 9 is a perspective view illustrating a finger touch action in a user interface providing device using information based on a finger type according to exemplary embodiments of the present invention.

FIG. 9(*a*) illustrates an example in which a large portion of the lower part of the finger 20 touches the display unit 11 and a finger touch area 81 may be large. FIG. 9(*b*) illustrates an example in which only a tip portion of the finger 20 touches the display unit 11 and a finger touch area 82 may be small. Accordingly, different instructions can be executed according to a finger touch action.

Figure 10:
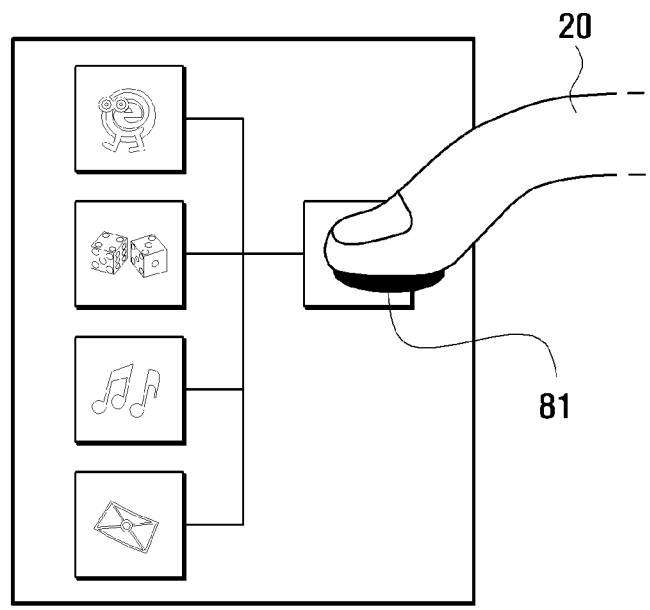
FIG. 10 illustrates a first example of instruction execution in the device of FIG. 9 according to exemplary embodiments of the present invention.

FIG. 10 illustrates a first example of instruction execution in the device of FIG. 9. In FIG. 10, an upper-level menu or a lower-level menu may be displayed according to a finger touch form.

Referring to FIG. 10, if the finger touch area 81 is 'large', a lower-level menu corresponding to the touched icon may be displayed. Although not shown in FIG. 10, if the finger touch area is 'small,' an upper-level menu corresponding to the touched icon may be displayed.

Figure 11:
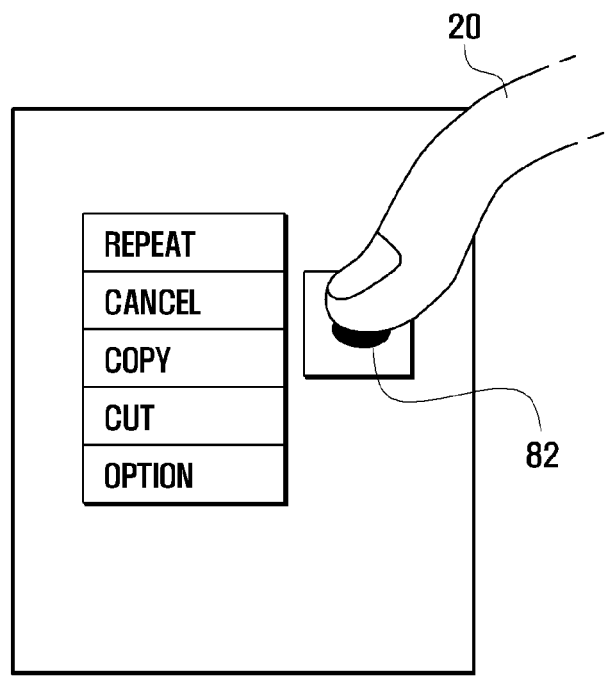
FIG. 11 illustrates a second example of instruction execution in the device of FIG. 9 according to exemplary embodiments of the present invention.

FIG. 11 illustrates a second example of instruction execution in the device of FIG. 9. In FIG. 11, an input instruction corresponding to a right button/left button operation of a conventional mouse may be executed according to a finger touch form.

Referring to FIG. 11, if the finger touch area 82 is 'small,' a menu may be displayed in a manner similar to clicking a right button of a conventional mouse while the mouse image is positioned on a corresponding icon. Although not shown in FIG. 11, if the finger touch area is 'large,' an instruction corresponding to a touched icon may be executed in a manner similar to clicking a left button of a conventional mouse while the mouse image is positioned on a corresponding icon.

FIG. 10 illustrates a display, according to a touch form of a finger, of an upper-level menu or lower-level menu with instructions being executed in a manner similar to clicking a right button or a left button on a conventional mouse. However, exemplary embodiments of the present invention are not limited thereto, and can also be applied to an input of a character. For example, when the finger touch area 81 is 'large,' a right character of the corresponding icon can be input, and when the finger touch area 81 is 'small,' a left character can be input.

Embodiment 3

Figure 12:
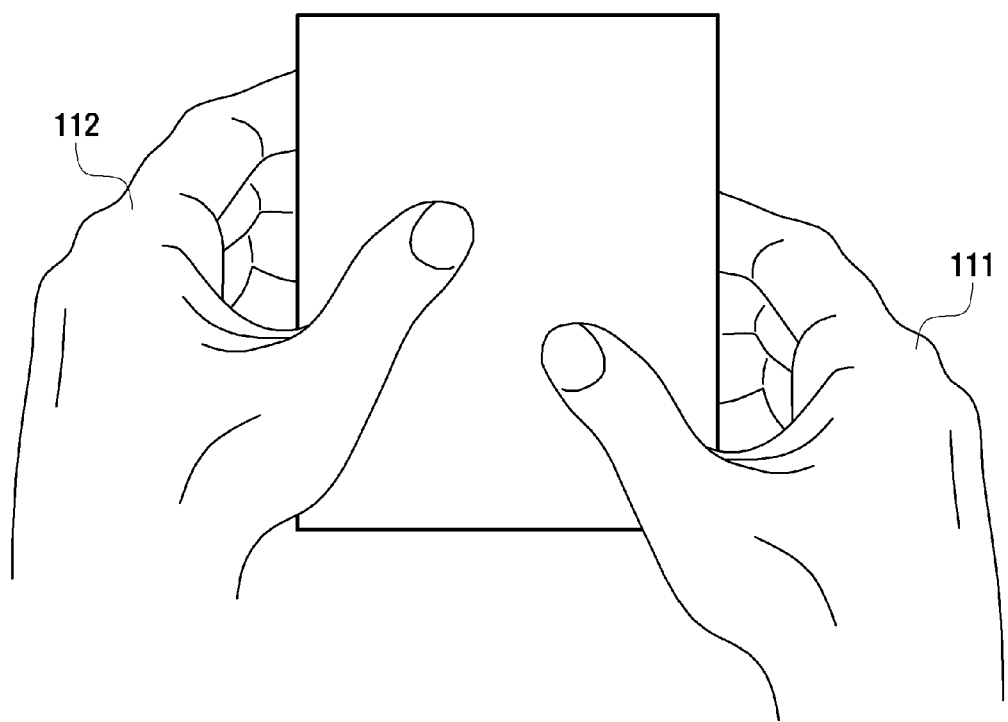
FIG. 12 is a perspective view illustrating a user interface providing device using information based on a finger type according to exemplary embodiments of the present invention.

FIG. 12 is a perspective view illustrating a device using information based on a finger type according to exemplary embodiments of the present invention.

Referring to FIG. 12, the controller 13 may determine whether a touching finger is a right hand finger 111 or a left hand finger 112 using a direction vector 33 of the detected finger. Further, in some cases a direction vector 33 of the touching finger 20 cannot be determined because the touch action is performed at an end portion (e.g., at the right side or the left side) of the display unit 11 such that the adjacent area 32 is not determined. If the direction vector 33 cannot be determined, the controller 13 may determine whether the touching finger is the right hand finger 111 or the left hand finger 112 based on whether the finger touch area 31 is towards the right side or the left side of the display unit 11. The controller 13 may execute an instruction according to the determined finger type information.

Figure 13:
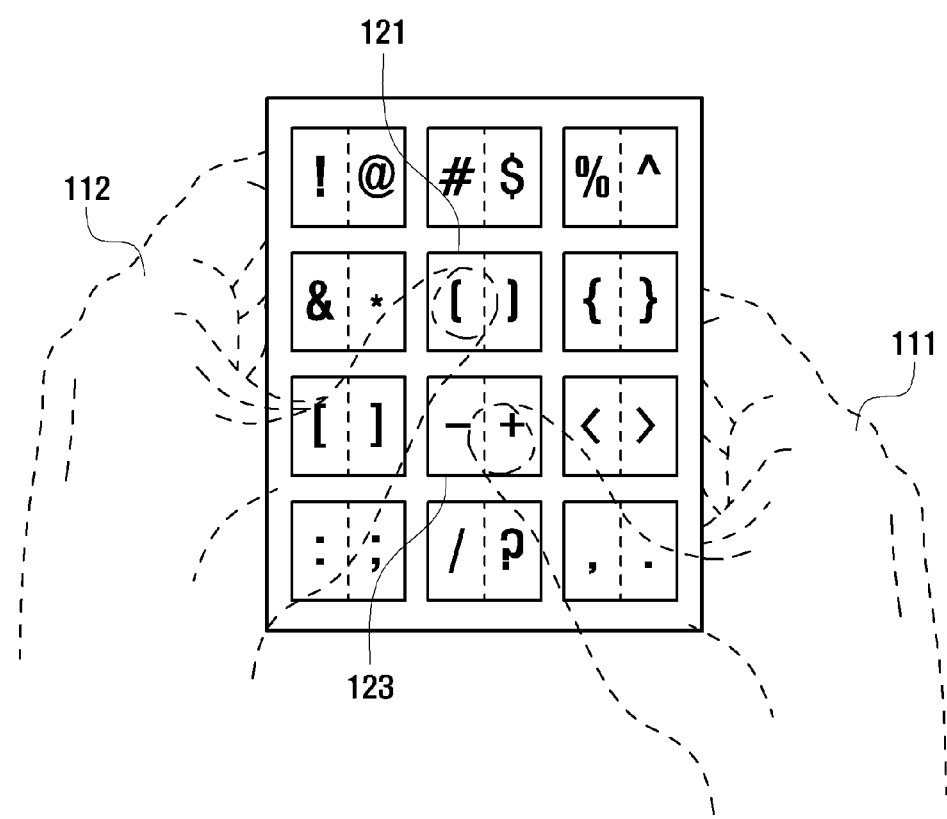
FIG. 13 illustrates an instruction execution in the device of FIG. 10 according to exemplary embodiments of the present invention.

FIG. 13 illustrates an instruction execution in the device of FIG. 12 when a character array for inputting a character is displayed in the display unit 11.

Referring to FIG. 13, for example, if the controller 13 determines that an icon 123 is touched by the right hand finger 111, a character '+' may be input, and if the controller 13 determines that the icon 123 is touched by the left hand finger 112, a character '−' may be input. If the controller 13 determines that an icon 121 is touched by the right hand finger 111, a character ']' may be input, and if the controller 13 determines that the icon 121 is touched by the left hand finger 112, a character '[' may be input.

Therefore, according to exemplary embodiments of the present invention, a finger type may be determined with a single touch action and different instructions may then be executed. Accordingly, when a character is input in a device having a small-sized display, such as, for example, a mobile terminal, a conventional input method in which a left character is input with a single touch action and a right character is input with two touch actions is unnecessary. Thus, a character can be input faster.

FIG. 13 illustrates a case of inputting a right or left character of a corresponding icon according to the finger type. However, exemplary embodiments of the present invention are not limited thereto and can be applied to, for example, displaying an upper-level menu or lower-level menu, and to displaying a menu executing an instruction in a manner similar to clicking a right button or a left button of a conventional mouse, as explained above. For example, if the touching finger type is the right hand finger 111, a menu may be displayed, similar to when a menu appears if a right button of a mouse is clicked on an icon. If the touching finger type is the left hand finger 112, an instruction corresponding to a touched icon may be executed, similar to when a left button of a mouse is clicked.

Embodiment 4

A description is provided regarding the operation of the user interface device when the user's finger touches a display unit 11 and inputs its movement thereon, with reference to FIGS. 14 to 18. In an embodiment of the present invention, the movement of the user's finger corresponds to a two-dimensional motion where the finger draws circles with respect to the finger touch area.

FIG. 14 illustrates a first example of an output screen of the device of FIG. 1 according to exemplary embodiments of the present invention.

FIG. 14(*a*) shows a screen displaying a picture in full screen on the display unit 11 where the user's finger touches the display unit 11 and performs a circle drawing motion thereon with respect to the finger touch area.

The sensor 12 detects the movement of the user's finger, generates a sensor signal, and outputs it to the controller 13. The controller 13 identifies the changed finger touch area 31 and the changed adjacent area 32 and detects a changed direction vector 34 of the finger based on the identified finger touch area 31 and the identified adjacent area 32. After that, the controller 13 compares the direction vector of the finger before the movement of the user's finger is input to the screen with the direction vector of the finger after the movement of the user's finger is input, estimates the change in an angle of the direction vector of the finger, and performs a function corresponding to the estimated changed angle of the direction vector. The controller 13 may determine whether the changed angle of the direction vector of the finger is equal to or greater than a preset angle. The controller 13 may ascertain that an event has occurred only if the changed angle of the direction vector of the finger is equal to or greater than a preset angle and then perform a corresponding function. In an embodiment of the present invention, the controller 13 may further estimate the change in a rate of angle of the direction vector of the finger. If the user's finger fast performs a circle drawing motion, the controller 13 may estimate the change in the rate of angle of the direction vector of the finger and then perform a corresponding function.

As shown in FIG. 14, screen (b) zooms in the picture displayed on screen (a). In an embodiment of the present invention, the display unit 11 can zoom in and display an image on the screen when the user's finger draws circles clockwise and can zoom out and display an image when the user's finger draws circles counterclockwise. If the user's finger rapidly draws circles on the screen, the display unit 11 can also rapidly zoom in or out an image. On the other hand, if the user's finger draws circles and then retains its location on the screen, the display unit 11 may gradually zoom in or out an image at a preset period.

FIG. 15 illustrates a second example of an output screen of the device of FIG. 1 according to exemplary embodiments of the present invention.

As shown in FIG. 15, screen (a) shows a state where the user's finger touches a selectable item and then draws circles with respect to the finger touch point.

Screen (a) shows a part of the entire item as the remaining part is cut off by the screen size. In that case, the controller 13 may execute a function to copy the cut off part of the item. When the user activates an MMS message writing window, loads a webpage in multitasking operation, touches a selectable item in the webpage, and then performs a circle draw motion, the item is automatically copied and then is registered as an attached file of the MMS message or pasted into the MMS message. As shown in FIG. 15, screen (b) shows a state where the selected item is automatically pasted into the MMS message writing window.

FIG. 16 illustrates a third example of an output screen of the device of FIG. 1 according to exemplary embodiments of the present invention.

As shown in FIG. 16, screen (a) shows a state where the finger touches an icon in a menu containing submenus. When the user finger touches a particular icon, the touched icon shows its submenu icons, such as 'twit,' 'blog,' and 'facebook,' according to finger type based information. As shown in screen (a), the type of the finger is shown in such a way that the finger tip points toward the upper left from the lower right, and the submenu icons are also aligned facing from the lower right to the upper left. As shown in FIG. 16, screen (b) shows a state where the finger tip points towards the upper right from the lower left as the finger draws circles clockwise on the screen (a). In that case, the submenu icons are also aligned facing from the lower left to the upper right. The user may also moves or arrays the GUIs while the finger is drawings circles on the screen.

FIG. 17 illustrates a fourth example of an output screen of the device of FIG. 1 according to exemplary embodiments of the present invention.

As shown in FIG. 17, screen (a) shows a state where the user's finger touches a reproduction icon at the lower left on the screen displaying a multimedia content and performs a circle drawing motion. In that case, the controller 13 performs a forward or rewind function and controls the display unit 11 to display a reproduction information scroll bar. For example, the controller 13 performs a forward function if the user's finger draws circles clockwise and a rewind function if the user's finger draws circles counter-clockwise.

As shown in FIG. 17, screen (b) shows a state where the user's finger touches a volume icon at the lower right on the screen displaying a multimedia content and performs a circle drawing motion. In that case, the controller 13 performs a volume up or down function and controls the display unit 11 to display a volume information scroll bar. For example, the controller 13 performs a volume up function if the user's finger draws circles clockwise and a volume down function if the user's finger draws circles counter-clockwise.

FIG. 18 illustrates a fifth example of an output screen of the device of FIG. 1 according to exemplary embodiments of the present invention.

As shown in FIG. 18, screen (a) shows a state where the user's finger touches a particular icon. In the case, the controller 13 controls the display unit 11 to execute the touched icon and outputs a corresponding function. If only a touch action is input, the controller 13 recognizes the action as a selection or execution event, which is similar to the click action of the left mouse button.

As shown in FIG. 18, screen (b) shows a state where the user's finger touches a particular icon and then performs a circle drawing motion. In the case, the controller 13 controls the display unit 11 to outputs a menu of copy/paste submenus. If a touch action and a circle drawing motion are input, the controller 13 recognizes the actions as a menu output event, which is similar to the click action of the right mouse button.

It should be understood that the present invention is not limited to the embodiment. For example, the screen may display a plurality of icons. If the user's finger touches one of the icons, the controller 13 executes a function corresponding thereto. Alternatively, if the user's finger touches one of the icons and then draws circles with respect thereto, the controls may switch its current mode to a mode for allowing the selection of a plurality of icons.

Embodiment 5

A description is provided regarding the operation of the user interface device when the user's finger touches a display unit 11 and inputs its movement thereon, with reference to FIG. 19. In an embodiment of the present invention, the movement of the user's finger corresponds to a three-dimensional motion where the finger slowly crooks to alter the finger touch area FIG. 19 illustrates an example of an output screen of the device of FIG. 1 according to another exemplary embodiment of the present invention.

As shown in FIG. 19, screen (a) is similar to that of FIG. 10 and shows a state where the tip portion of the user's finger from the top to the first knuckle entirely touches the screen. The controller 13 detects the size of the finger touch area 81 and then controls the display unit 11 to output a GUI corresponding thereto. As shown in screen (a), the controller 13 controls the display unit 11 to display submenu icons. It is assumed that the touch action is performed by only the tip of the crooked finger.

As shown in FIG. 19, screen (b) is similar to that of FIG. 11 and shows a state where a part of the tip portion of the user's finger touches the screen. The controller 13 detects the size of the finger touch area 82 and then controls the display unit 11 to output a GUI corresponding thereto. As shown in screen (b), the controller 13 controls the display unit 11 to display upper menu icons. It is assumed that the touch action is performed by only the tip of the crooked finger. That is the controller 13 can recognize the change in the size of the finger touch area and then control the display unit 11 to change and display GUIs.

A method of executing an instruction according to information based on a finger detected by an optical touch sensor is recorded as a program in a computer-readable recording medium. A program for detecting a finger and for executing an instruction includes an instruction for displaying at least one graphic user interface (GUI) on the display unit 11, an instruction for identifying, if a user's finger touch is input on the screen, a finger touch area and an adjacent area on the screen based on a sensor signal generated by the sensor 12, an instruction for generating touch finger shape-based information according to the identified touch area 31 and the identified adjacent area 32, and an instruction changing and displaying the GUI according to the touch finger shape-based information.

If the sensor 12 is implemented with an optical sensor, the program may include an instruction instructing the sensor 12 to detect a touch action of the finger 20 in the display unit 11 and to obtain an image of the finger 20, an instruction instructing the controller 13 to determine the finger touch area 31 and the adjacent area 32 based on an image of the finger 20 obtained by the optical sensor 12, and an instruction instructing the controller 13 to determine a touched icon based on the finger touch area 31. The program further includes an instruction instructing the controller 13 to generate information based on a finger type determined from the finger touch area 31 and the adjacent area 32 according to the instruction corresponding to the detected icon, and an instruction instructing the controller 13 to execute the instruction corresponding to the detected icon according to the information based on the finger type. The information based on the finger type may include a user's location, a touch form of a finger, and the finger type. The instructions are executed according to the information as described above in the exemplary embodiments.

Figure 20:
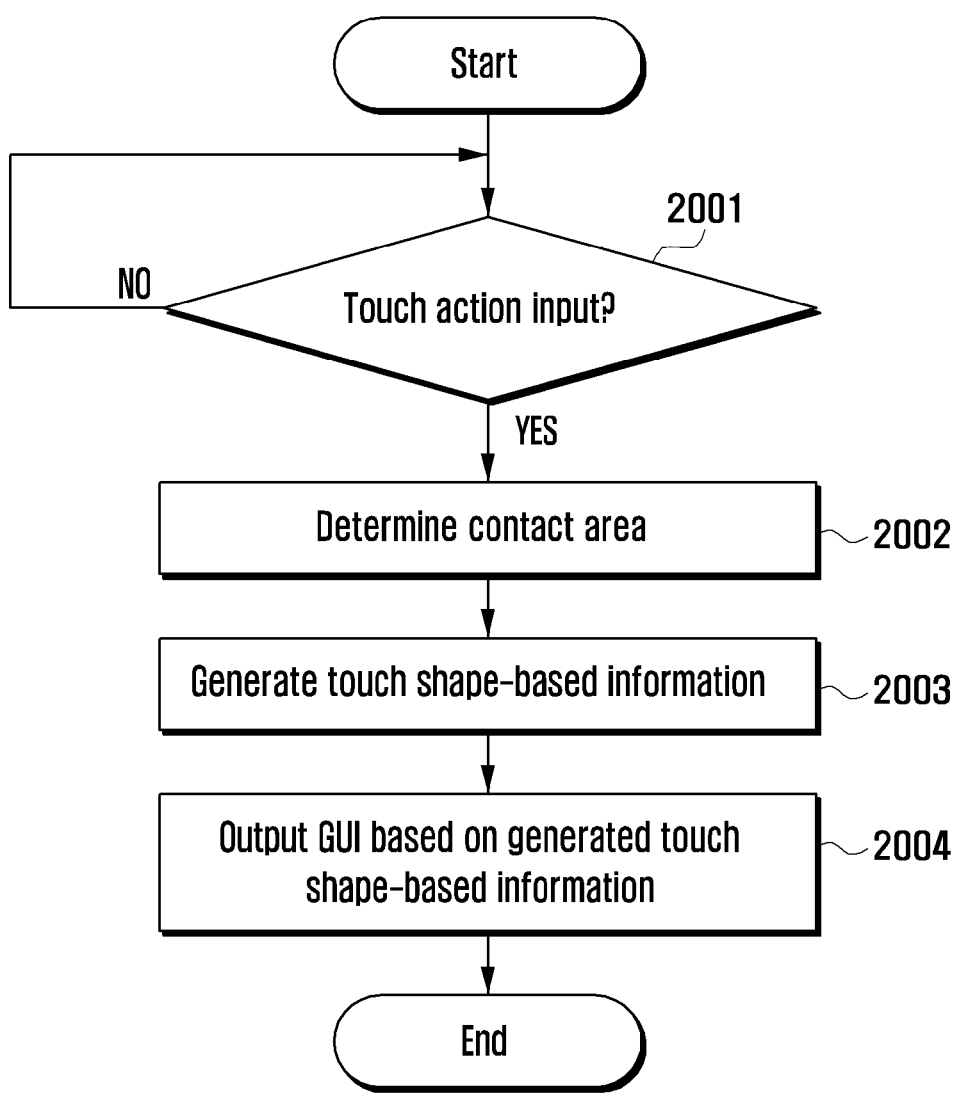
FIG. 20 is a flowchart illustrating a method of providing a user interface according to exemplary embodiments of the present invention.

FIG. 20 is a flowchart illustrating another method of providing a user interface according to exemplary embodiments of the present invention.

In FIG. 20, the sensor 12 may be any suitable sensor, including for example, one of an optical sensor and a touch sensor. The touch sensor may include a capacitance touch sensor and a pressure-sensitive touch sensor.

The controller 13 may control the sensor 12 to determine whether a touch action is input on a screen by a user (2001).

If a touch action is input on a screen by a user with at least one finger, the sensor 12 may generate a sensor signal and output the sensor signal to the controller 13. When the sensor 12 is formed with an optical sensor, the sensor signal may include information about a light reflection amount; when the sensor 12 is formed with a capacitance touch sensor, the sensor signal may include information about a change amount (e.g., loss amount) of electric charges of a screen surface; and when the sensor 12 is formed with a pressure-sensitive touch sensor, the sensor signal may include information about a pressure value. In general, any type of information may be provided according to the type of sensor 12 being used.

The controller 13 may receive a sensor signal from the sensor 12, and may determine a contact area (2002). When the sensor 12 is formed as an optical sensor, the controller 13 may determine an area in which a light reflection amount is concentrically distributed as a contact area. When the sensor 12 is formed as a capacitance touch sensor, the controller 13 may determine an area in which a loss amount of electric charges is greatest as a contact area. When the sensor 12 is formed with a pressure-sensitive touch sensor, the controller 13 may determine an area to which a pressure is input as a contact area.

Next, the controller 13 may generate touch shape-based information based on the determined contact area (2003). Touch shape-based information may include, for example, a contact surface pattern, a length of a contact area, and a direction vector of a contact area, but is not limited thereto. The controller 13 may analyze a form of the contact area and may determine whether the contact area satisfies a predetermined contact surface pattern. If the contact area satisfies the predetermined contact surface pattern, the controller 13 may measure a horizontal length and a vertical length of the contact area, and, in some cases, may determine a relatively greater value as a length of the contact area. Further, the controller 13 may generate a direction vector of the contact area in a direction toward a length of the generated contact area. For example, when the user touches a finger on a screen, the controller 13 may generate a direction vector of the contact area in a pointing direction of the user's fingertip. For instance, the direction vector may indicate the direction the user's fingertip may move based on the determined orientation or pointing direction of the user's fingertip.

The controller 13 may then control the display unit 11 to output a preset GUI based on the generated touch shape-based information (2004). The preset GUI may be any suitable GUI, including, for example, a keyboard, a search window, and/or a pointing GUI.

Embodiment 6

Exemplary embodiments describe a function performed by the user interface device 10 when a user inputs a touch action in a direction toward the center of the display unit 11 with two fingers, with reference to FIGS. 21A, 21B, 22, 23, and 24.

Figure 21A:
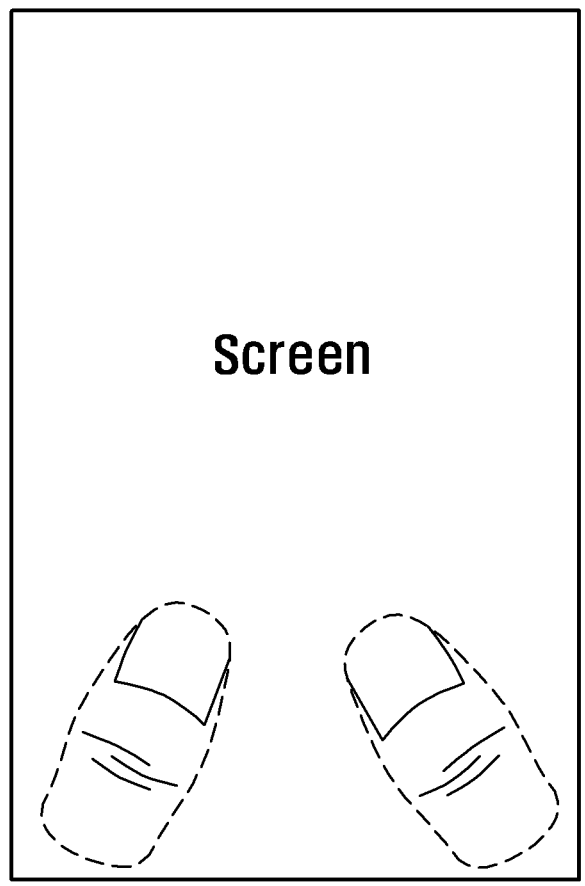
FIG. 21A illustrates a form in which a user puts two thumbs on a screen according to exemplary embodiments of the present invention.
Figure 21B:
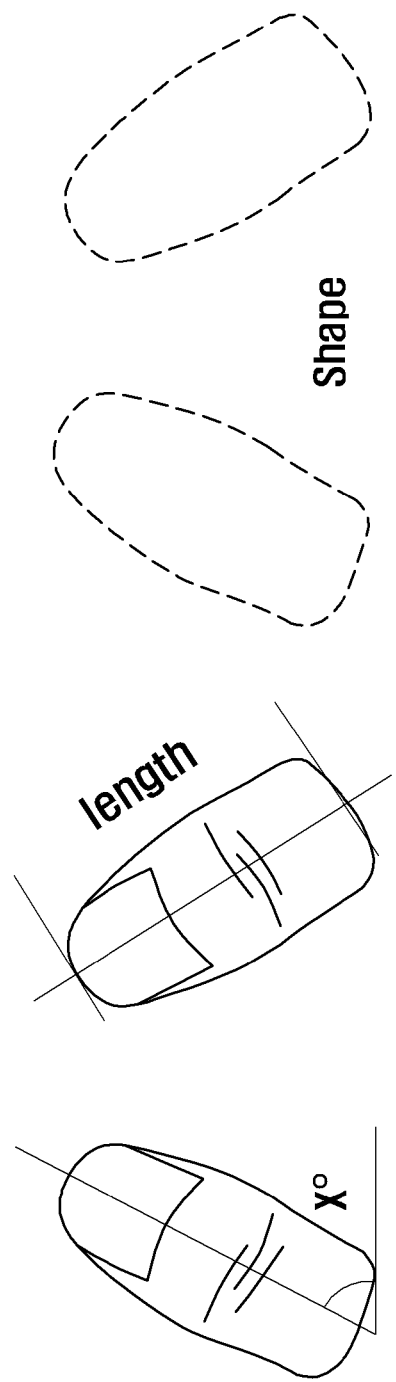
FIG. 21B illustrates a contact surface pattern of forming touch shape-based information, a length of a contact area, and a direction vector of a contact area according to exemplary embodiments of the present invention.

FIG. 21A illustrates an example in which a user puts two thumbs on a screen, and FIG. 21B illustrates a contact surface pattern according to touch shape-based information, a length of a contact area, and a direction vector of a contact area.

When the user puts two thumbs on the display unit 11, as shown in FIG. 21A, the controller 13 may determine a contact area and may determine touch shape-based information according to the contact surface pattern, a length of the contact area, and a direction vector of the contact area.

Referring to FIG. 21B, the controller 13 may determine a contact surface pattern with two contacted fingers, may measure a horizontal length and a vertical length of the contact area, may determine a relatively longer vertical length as a length of the contact area, and may generate an angle X° formed by the length direction of the contact area and a horizontal direction of the display unit 11 to determine the direction vector of the contact area.

Accordingly, the controller 13 may generate touch shape-based information formed with a contact surface pattern, a length of the contact area, and a direction vector of the contact area.

When touch shape-based information satisfies a predetermined condition, the controller 13 may control the display unit 11 to display a keyboard and a search window. For example, when two fingers touch the display unit 11 at an angle (e.g., greater than, equal to or less than a predetermined angle), the corresponding contact surface pattern, the length of the contact area, and the direction vector of the contact area may be determined, and the controller 13 may then control the display unit 11 to display a keyboard and a search window.

FIG. 22 is a diagram illustrating an output screen of a user interface providing device 10 using touch shape-based information according to exemplary embodiments of the present invention.

FIG. 22[a] illustrates a content execution screen formed with a text and an image, and FIG. 22[b] illustrates an example in which a user puts two fingers at an angle on the content execution screen of FIG. 22[a].

As illustrated in FIG. 22, the controller 13 may recognize a user's touch action input, generate touch shape-based information, and control the display unit 11 according to the generated touch shape-based information to display a preset GUI.

FIG. 22[c] illustrates an example in which a keyboard and a search window are overlaid on the content execution screen of FIG. 22[a] in response to the user's touch action displayed in FIG. 22[b].

The controller 13 may recognize an input in which the user puts two fingers at an angle on the display unit 11 and may control the display unit 11 to display a keyboard and a search window.

Figure 23:
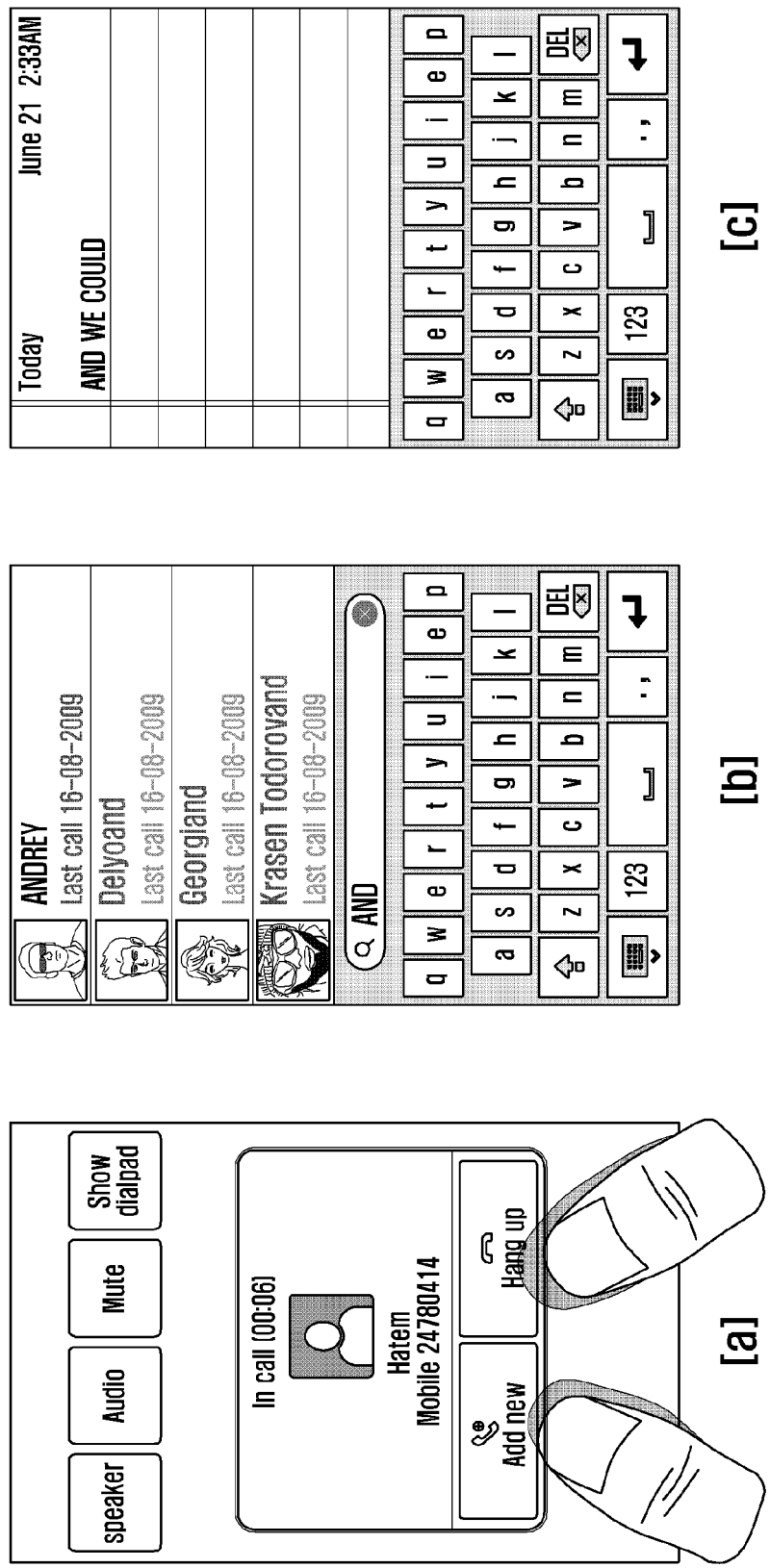
FIG. 23 is a diagram illustrating another output screen of a user interface providing device using touch shape-based information according to exemplary embodiments of the present invention.

FIG. 23 is a diagram illustrating another output screen of a user interface providing device 10 using touch shape-based information according to exemplary embodiments of the present invention.

FIG. 23[a] illustrates an example in which a user puts two fingers at an angle when a phone receiving screen is displayed.

The controller 13 may recognize the input in which the user puts two fingers at an angle on the display unit 11, and may control the display unit 11 to display a preset GUI.

FIG. 23[b] illustrates an example in which a keyboard and a search window are overlaid on a contact list screen as a result of the user's two finger input.

The controller 13 may control the display unit 11 to change display of the phone receiving screen to a contact list screen and to overlay and display a keyboard and a search window on the converted contact list screen. The controller 13 may then detect the user's keyboard input through the sensor 12, select a contact list corresponding to the input key, and control the display unit 11 to display the selected contact list.

FIG. 23[b] illustrates an example of displaying a contact list having a keyword of 'AND' when a user inputs 'AND' in a search window.

When selecting a contact list corresponding to one or more keys input through a keyboard, if a contact list corresponding to the input key does not exist, the controller 13 controls the display unit 11 to display a memo pad. For instance, the controller 13 may control the display unit 11 to change display of the contact list to display of a memo pad, and to overlay and display a keyboard and a search window (not shown) on the memo pad, as shown in FIG. 23[c].

Figure 24:
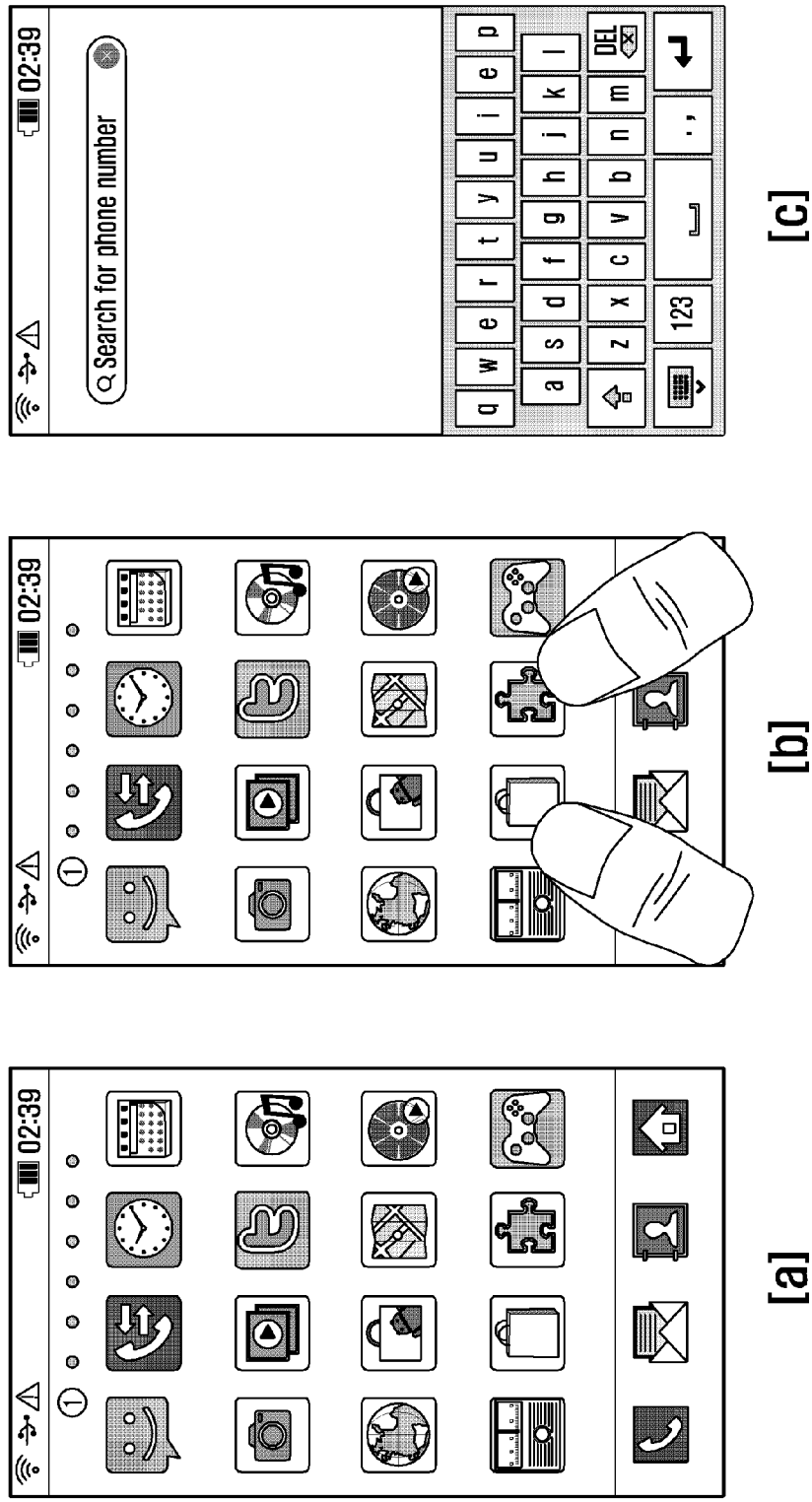
FIG. 24 is a diagram illustrating another output screen of a user interface providing device using touch shape-based information according to exemplary embodiments of the present invention.

FIG. 24 is a diagram illustrating another output screen of a user interface providing device 10 using touch shape-based information according to exemplary embodiments of the present invention.

FIG. 24[a] illustrates a home screen formed with a plurality of icons, and FIG. 24[b] illustrates an example in which a user places two fingers with at an angle on the home screen of FIG. 24[a].

When the controller 13 recognizes an input in which the user puts two fingers at an angle on the display unit 11, the controller 13 may control the display unit 11 to display a preset GUI.

FIG. 24[c] illustrates an example in which a keyboard and a phonebook search window are displayed in response to the two finger input by the user.

The controller 13 may control the display unit 11 to change display of a home screen to a phonebook search screen and to display a phonebook search window and a keyboard.

Embodiment 7

Figure 25:
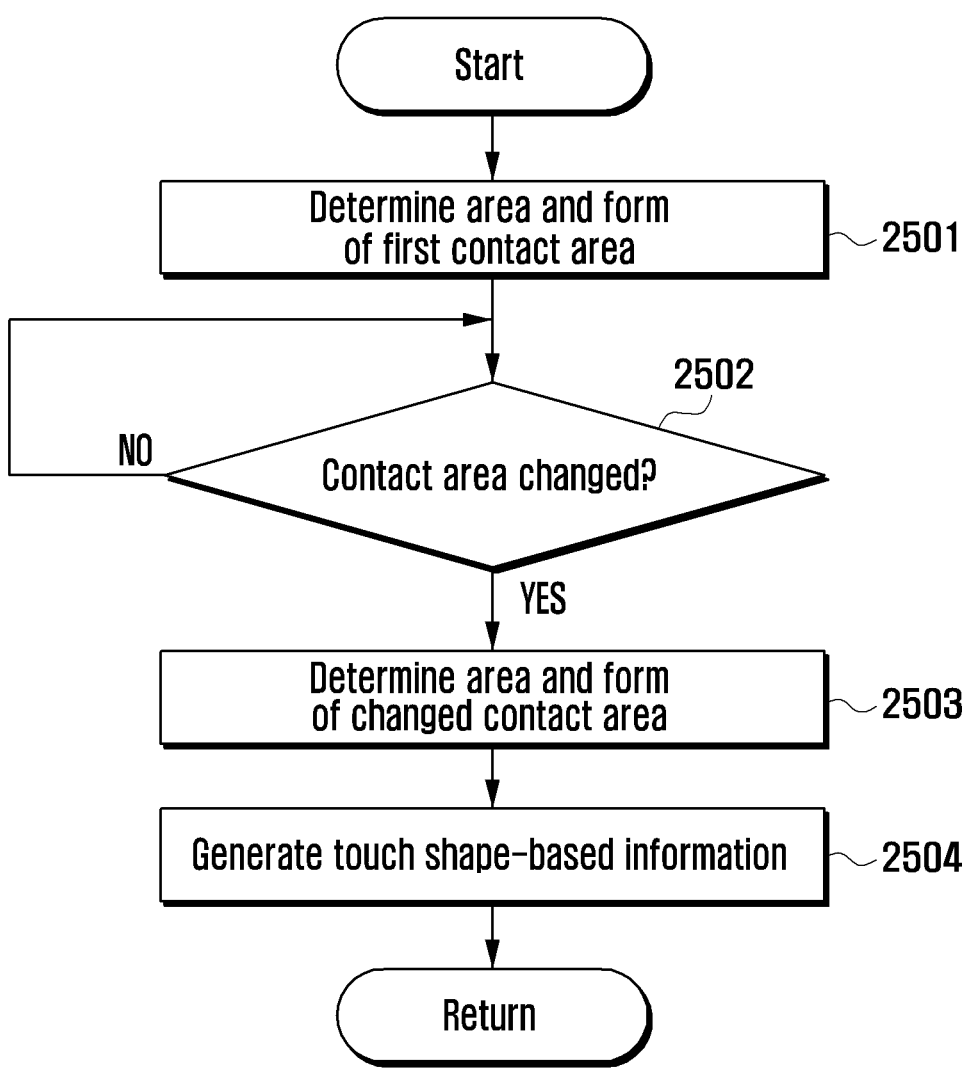
FIG. 25 is a flowchart illustrating a detailed process of step 2003 of FIG. 20 according to exemplary embodiments of the present invention.
Figure 26:
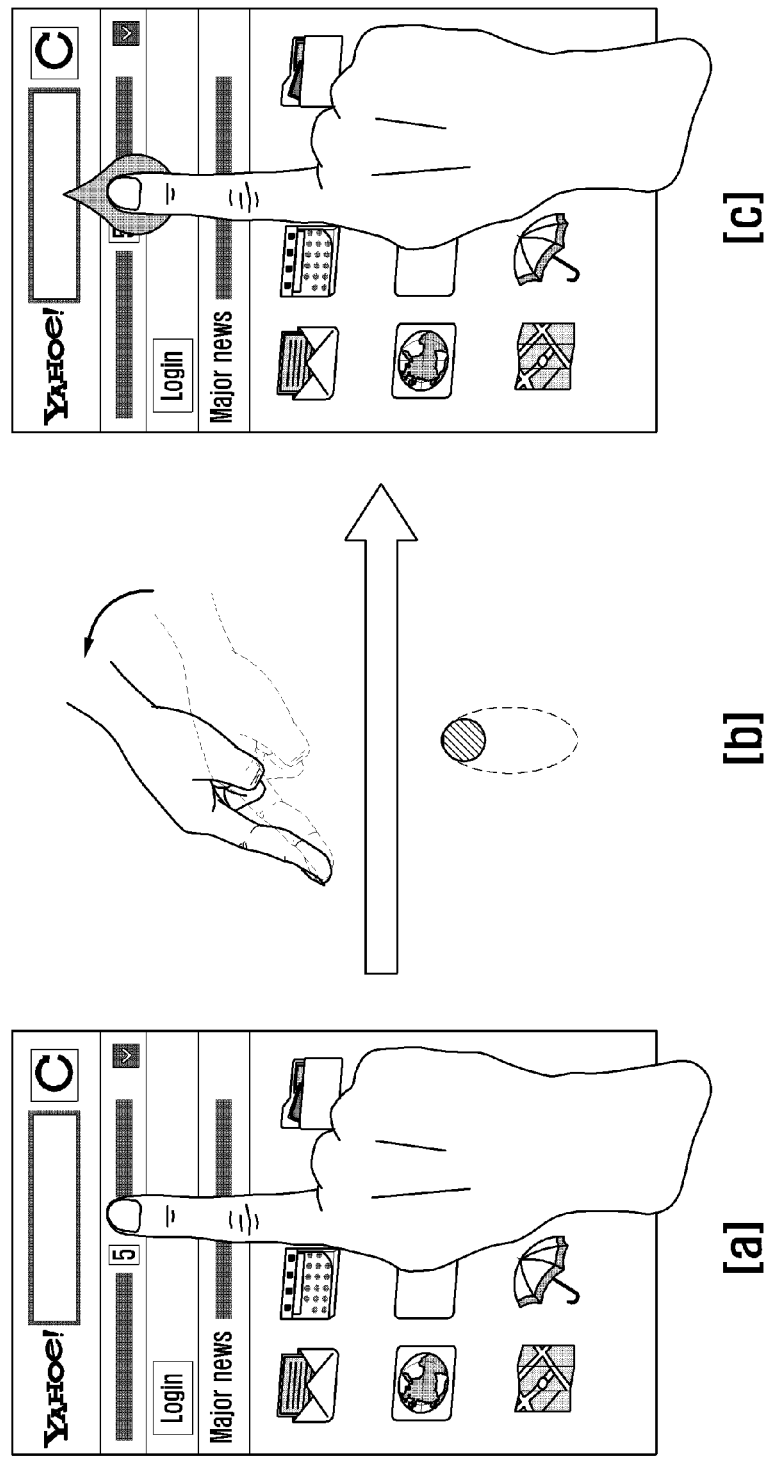
FIG. 26 is a diagram illustrating an output screen of a user interface providing device using touch shape-based information according to exemplary embodiments of the present invention.

Exemplary embodiments describe a function performed by the user interface device 10 when a user touches a finger on the display unit 11 and inputs an action of moving the user's finger with reference to FIGS. 20, 25, and 26. The action of moving a finger may correspond to a three-dimensional motion in which the user may change a finger contact area by slowly bending the finger.

FIG. 25 is a flowchart illustrating a detailed process of step 2003 of FIG. 20 according to exemplary embodiments of the present invention.

The controller 13 may determine an area and form of a first contact area (2501). When the user inputs a touch action on the display unit 11 using an entire end of a finger as if a fingerprint were imprinted, the controller 13 may determine the area and form of the contact area through the sensor 12.

In some cases, when the user inputs a touch action using an entire end of a finger, a form of the contact area may have an elongated form.

The controller 13 may then determine whether the contact area has changed using the sensor 12 (2502). For example, when the user inputs a three-dimensional action of slowly bending a finger, only an end portion of the finger may contact the display unit 11, and, as a result, the contact area may change from the initial contact area formed by the user's touch action. The controller 13 may recognize the change in the contact area through the sensor 12. If the contact area does not change, the controller 13 may wait until the user's action indicates a change in the contact area.

The controller 13 may subsequently determine an area and form of the changed contact area (2503).

Because only an end portion of a finger may contact the display unit 11, the controller 13 may determine an area of the contact area as being relatively smaller than an area of the contact area determined at step 2501 and may determine a form of the contact area as being a round form.

The controller 13 may then generate touch shape-based information (2504). The touch shape-based information may be formed taking into account the area and form of the changed contact area.

Referring back to FIG. 20, the controller 13 may control the display unit 11 to display a GUI according to the generated touch shape-based information (2004). That is, when a change in the area and form of the contact area satisfies a predetermined condition, the controller 13 may control the display unit 11 to display a preset GUI. In some cases, the controller 13 may control the display unit 11 to display a pointing GUI. When a plurality of items is displayed on the display unit 11, the pointing GUI may be an object for selecting one item.

FIG. 26 is a diagram illustrating an output screen of the user interface providing device 10 using touch shape-based information according to exemplary embodiments of the present invention.

FIG. 26[a] illustrates an example in which a user's finger touches a web browser execution screen, and FIG. 26[b] illustrates an example in which the user changes a finger contact area by slowly bending a finger and/or by lowering or raising the user's hand. Referring to FIG. 26[b], the contact area may change from an elongated form to a round form, and an area of the contact area may consequently reduce.

The controller 13 may determine the change in the area and form of the contact area and may control the display unit 11 to display a preset GUI. FIG. 26[c] illustrates an example in which a pointing GUI such as, for example, a waterdrop form, is displayed in the contact area. The uppermost portion of the waterdrop may be a pointing point, and the user can select a desired item while moving a pointing GUI in the waterdrop form. Accordingly, by raising a user's hand or slowly bending a user's finger, the user can select a desired item using a pointing GUI, such as a waterdrop.

Embodiment 8

Figure 27:
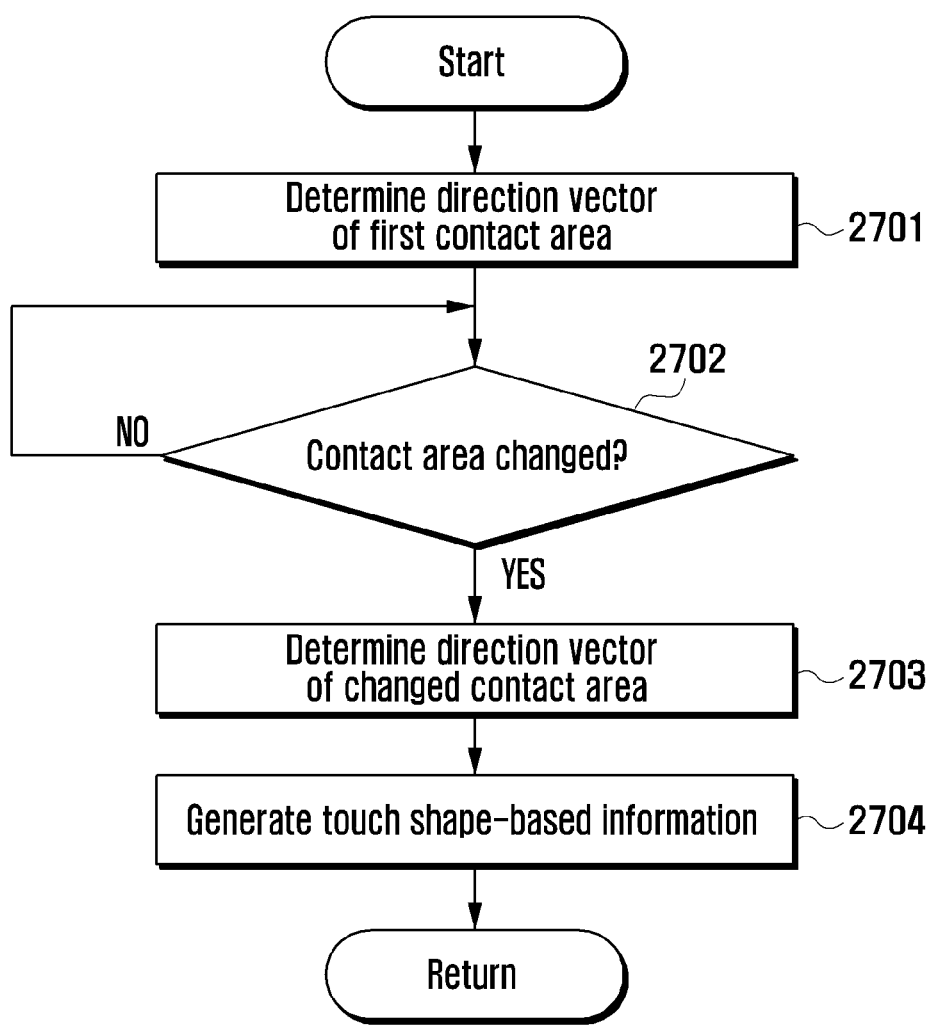
FIG. 27 is a flowchart illustrating a detailed process of step 2003 of FIG. 20 according to exemplary embodiments of the present invention.

Exemplary embodiments describe a function performed by the user interface device 10 when a user touches a finger on the display unit 11 and inputs an action of moving the finger with reference to FIGS. 20, 27, and 28. The action of moving a finger may correspond to a two-dimensional motion in which the user rotates a finger about a finger contact area.

FIG. 27 is a flowchart illustrating a detailed process of step 2003 of FIG. 20 according to exemplary embodiments of the present invention.

The controller 13 may determine a direction vector of a first contact area (2701). When the user inputs a touch action on the display unit 11 using the entire end of the user's finger like a fingerprint being imprinted, the controller 13 may determine a direction vector of the contact area using sensor 12. For example, when the user inputs a touch action using the entire end of the user's finger, the contact area may have an elongated form, and the controller 13 may determine a point of a finger end portion. The controller 13 may also determine a pointing direction of a finger end portion using the direction vector of the contact area. For example, one of four sides for forming the display unit 11 may be a base line of the direction vector. The controller 13 may determine an angle formed by a line parallel to the pointing direction of a finger end portion and one of four sides of the display unit 11 with the direction vector of the contact area.

The controller 13 may determine whether the contact area changes via the sensor 12 after the initial user touch action (2702). If the user inputs a two-dimensional action of rotating a finger, the contact area may change partially or completely. The controller 13 may recognize the change in the contact area.

Next, the controller 13 may determine a direction vector of the changed contact area (2703). The direction vector may be determined as described hereinabove, for example, based on a movement of the user's finger. A pointing direction of a finger end portion and the contact area may change according to a rotation action of the user's finger.

After determining the direction vector of the changed contact area, the controller 13 may generate touch shape-based information (2704).

Referring back to FIG. 20, the controller 13 may control the display unit 11 to output a GUI according to the generated touch shape-based information (2004). For example, when an angle change of a direction vector satisfies a predetermined condition, the controller 13 may control the display unit 11 to display a preset GUI. In some cases, the controller 13 may control the display unit 11 to rotate and display a presently displayed image. For example, the controller 13 may control the display unit 11 to rotate and display an image in the same direction as a finger rotation direction.

FIG. 28 is a diagram illustrating an output screen of a user interface providing device 10 using touch shape-based information according to exemplary embodiments of the present invention.

FIG. 28[a] illustrates an example in which the user touches a finger on an image display screen and rotates the finger, and FIG. 28[b] illustrates an example in which an image is rotated by 90° according to the user's finger rotation action.

The controller 13 may determine an angle change of a vector direction and may control the display unit 11 to rotate a presently displayed image by 90° in the direction of the angle change and to display the image.

The controller 13 may measure an angle change value of a vector direction, and determine if the angle change value of a vector direction is equal to or greater than a predetermined critical angle. If the angle change value of a vector direction is equal to or greater than a predetermined critical angle, the controller 13 may control the display unit 11 to rotate and display an image by any predefined angle, for example, 90°. For example, when the user inputs a finger rotation action at an angle equal to or greater than the predetermined critical angle, an image may be rotated by 90° or by the predefined angle. The predetermined critical angle may be set according to preferences of the user interface providing device 10 manufacturer.

Further, the controller 13 may measure an angle change speed value of a vector direction, and determine if the angle change speed value of a vector direction is equal to or greater than a predetermined critical speed. If the angle change speed value of a vector direction is equal to or greater than the predetermined speed, the controller 13 may control the display unit 11 to rotate and display an image by a predefined angle, for example, 90°. For example, when the user inputs a finger rotation action at a speed equal to or greater than the predetermined speed, an image may be rotated by 90° or by the predefined angle. The predetermined critical speed may be set according to preferences of the user interface providing device 10 manufacturer.

Embodiment 9

Figure 29:
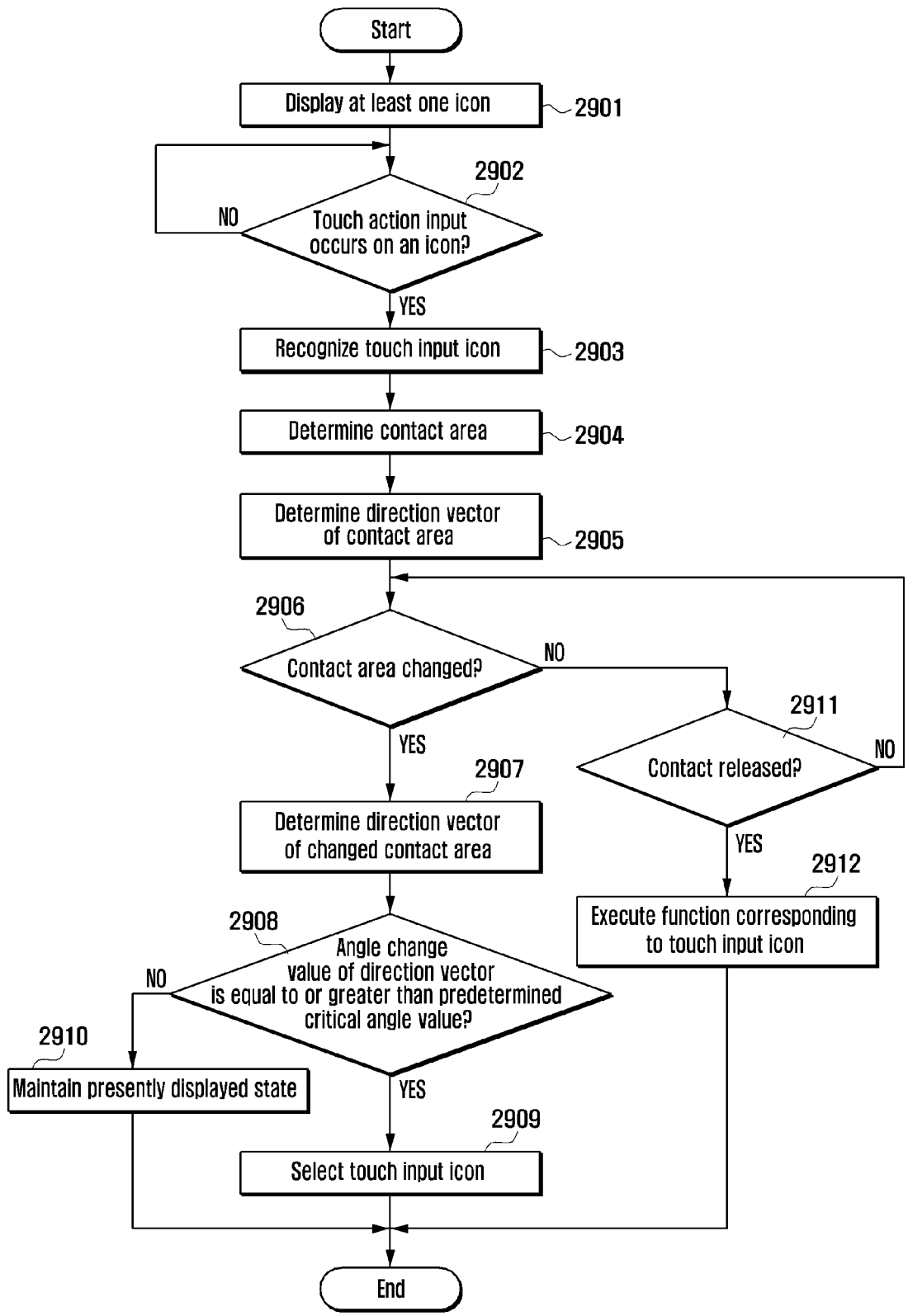
FIG. 29 is a flowchart illustrating a method of providing a user interface according to exemplary embodiments of the present invention.
Figure 30:
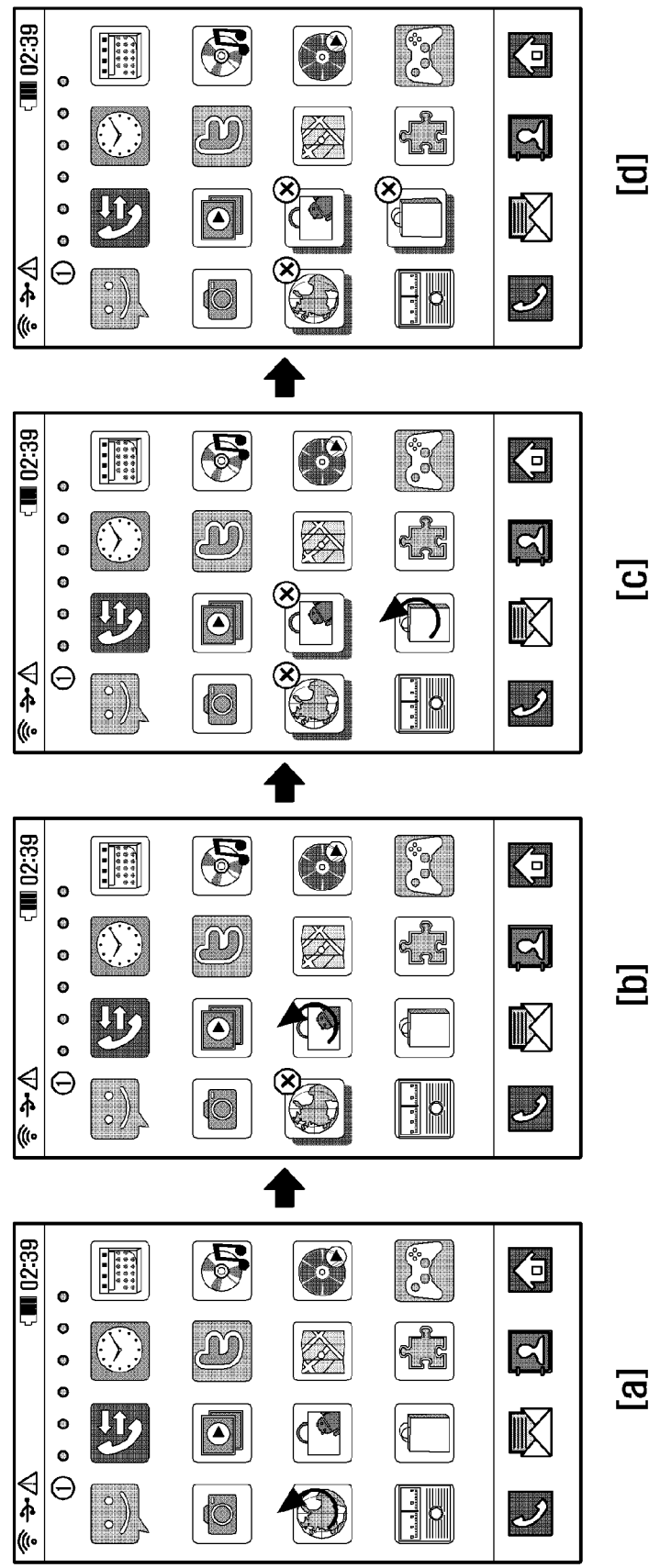
FIG. 30 is a diagram illustrating an output screen of a user interface providing device using touch shape-based information according to exemplary embodiments of the present invention.

Exemplary embodiments describe a function performed by the user interface device 10 when a user touches the display unit 11 with a finger and inputs an action of moving the finger with reference to FIGS. 29 and 30. The action of moving a finger may correspond to a two-dimensional motion in which the user rotates the finger about a finger contact area.

FIG. 29 is a flowchart illustrating a method of providing a user interface according to exemplary embodiments of the present invention.

The controller 13 may control the display unit 11 to display at least one icon (2901).

The controller 13 may determine whether a user's touch action input occurs on an icon using sensor 12 (2902). If a touch action input does not occur, the controller 13 may continue displaying the at least one icon.

If a user's touch action input is detected on an icon, the controller 13 recognizes the touch input icon corresponding to the touch action input (2903).

The controller 13 may then determine a contact area corresponding to the touch action input (2904) and may determine a direction vector of the contact area (2905). When the user inputs a touch action using the end of a finger (e.g., like a finger print), the contact area may be in an elongated form, and the controller 13 may determine the contact point of the finger end portion. The controller 13 may also determine a pointing direction of the finger end portion with a direction vector of the contact area.

Next, the controller 13 may determine whether the contact area has changed using sensor 12 (2906). If the user inputs a two-dimensional action of rotating a finger, the contact area may partially or completely change. The controller 13 may recognize the change in the contact area using sensor 12.

If the contact area has changed, the controller 13 may determine a direction vector of the changed contact area (2907). The pointing direction of the finger end portion and the direction vector of the changed contact area may change according to the rotation action of the user's finger.

Next, the controller 13 may determine whether an angle change value of the direction vector is equal to or greater than a predetermined critical angle value (2908). The predetermined critical angle value may be set according to preferences of the user interface providing device 10 manufacturer.

If the angle change value of the direction vector is equal to or greater than the predetermined critical angle value, the controller 13 may select a touch input icon situated in the contact area (2909). In some cases, selection of an icon may indicate entering an icon editing mode for movement, deletion, and grouping of the icon. The icon editing mode may edit only the selected icon(s) instead of editing all icons displayed on a screen. For example, the controller 13 may control the display unit 11 to display a 'delete' item corresponding to the selected icon. Further, the controller 13 may control the display unit 11 to display the selected icon at a different position from the original position of the selected icon. For example, the selected icon may be displayed with a slight offset or at a preset distance and angle from the original position of the selected icon.

If an angle change value of the direction vector is less than a predetermined critical angle value at step 2908, the controller 13 may control the display unit 11 to maintain the displayed state of the display unit 11 (2910).

If a contact area is not changed at step 2906, the controller 13 may determine whether a contact is released using sensor 12 (2911).

If a contact is released, the controller 13 may execute a function corresponding to the touch input icon (2912). If a contact is not released, the controller 13 may return to step 2906 to determine if a contact area has changed.

FIG. 30 is a diagram illustrating an output screen of the user interface providing device 10 using touch shape-based information according to exemplary embodiments of the present invention.

FIG. 30[*a*] illustrates an example in which a user's finger touches an icon on a home screen displaying a plurality of icons. After touching the icon, the user may rotate the user's finger. FIG. 30[*b*] illustrates an example in which the icon is selected according to the user's finger rotation action. In response to the user's finger rotation action, a delete item of an 'X' form may be displayed on the selected icon and the selected icon may be displayed at a slightly offset position from the original position of the selected icon.

FIGS. 30[*b*] to 30[*d*] illustrate examples in which the user sequentially selects icons. The user can input a 'move', 'delete', and/or 'grouping' instructions for each of the selected icons. For example, in FIG. 30[*c*], the user may select an icon next to the previously selected icon by using the user's finger. After inputting a user finger rotation action, the second selected icon may also display a corresponding delete item "X". An icon below the second selected icon may also be selected in a similar manner as shown in FIG. 30[*d*].

Embodiment 10

Figure 31:
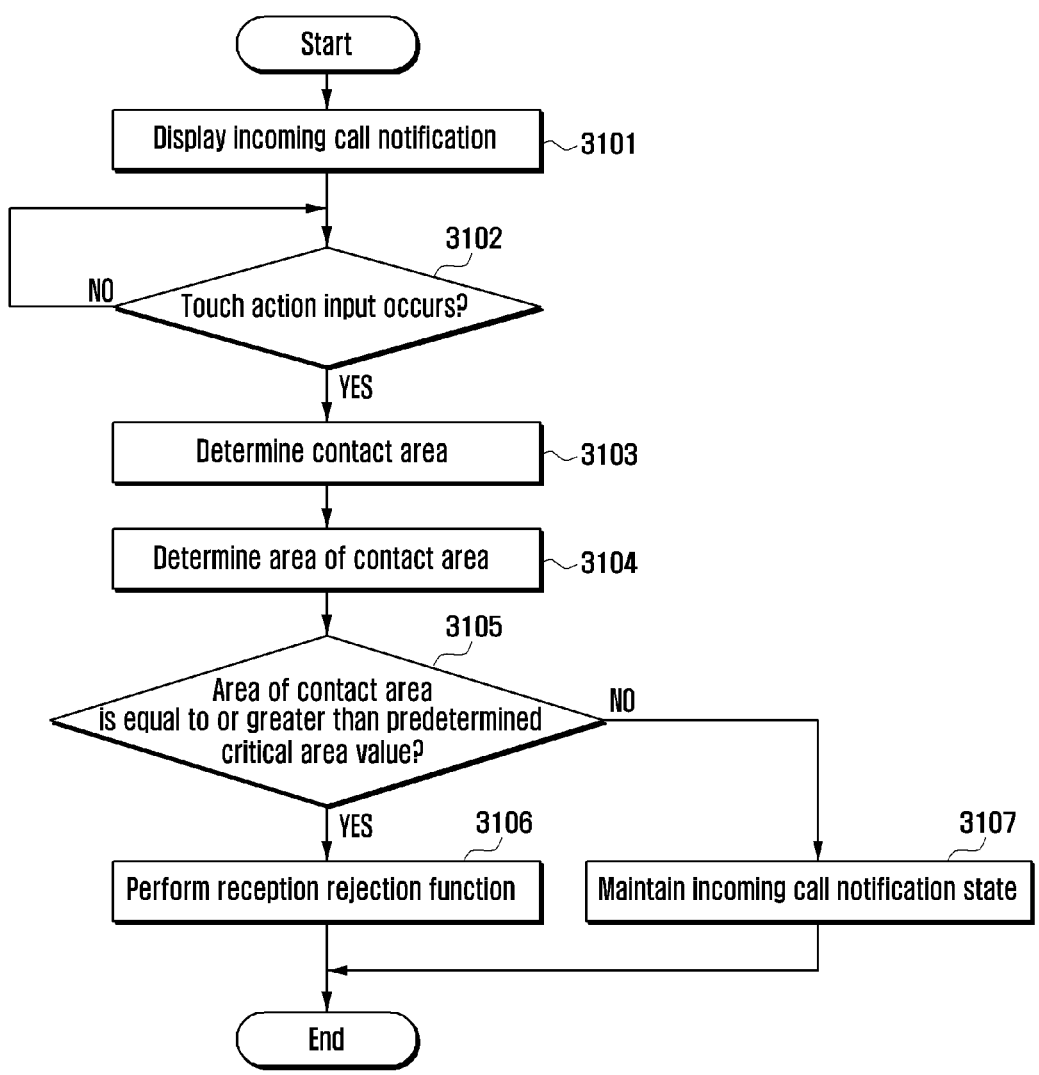
FIG. 31 is a flowchart illustrating a method of providing a user interface according to exemplary embodiments of the present invention.
Figure 32:
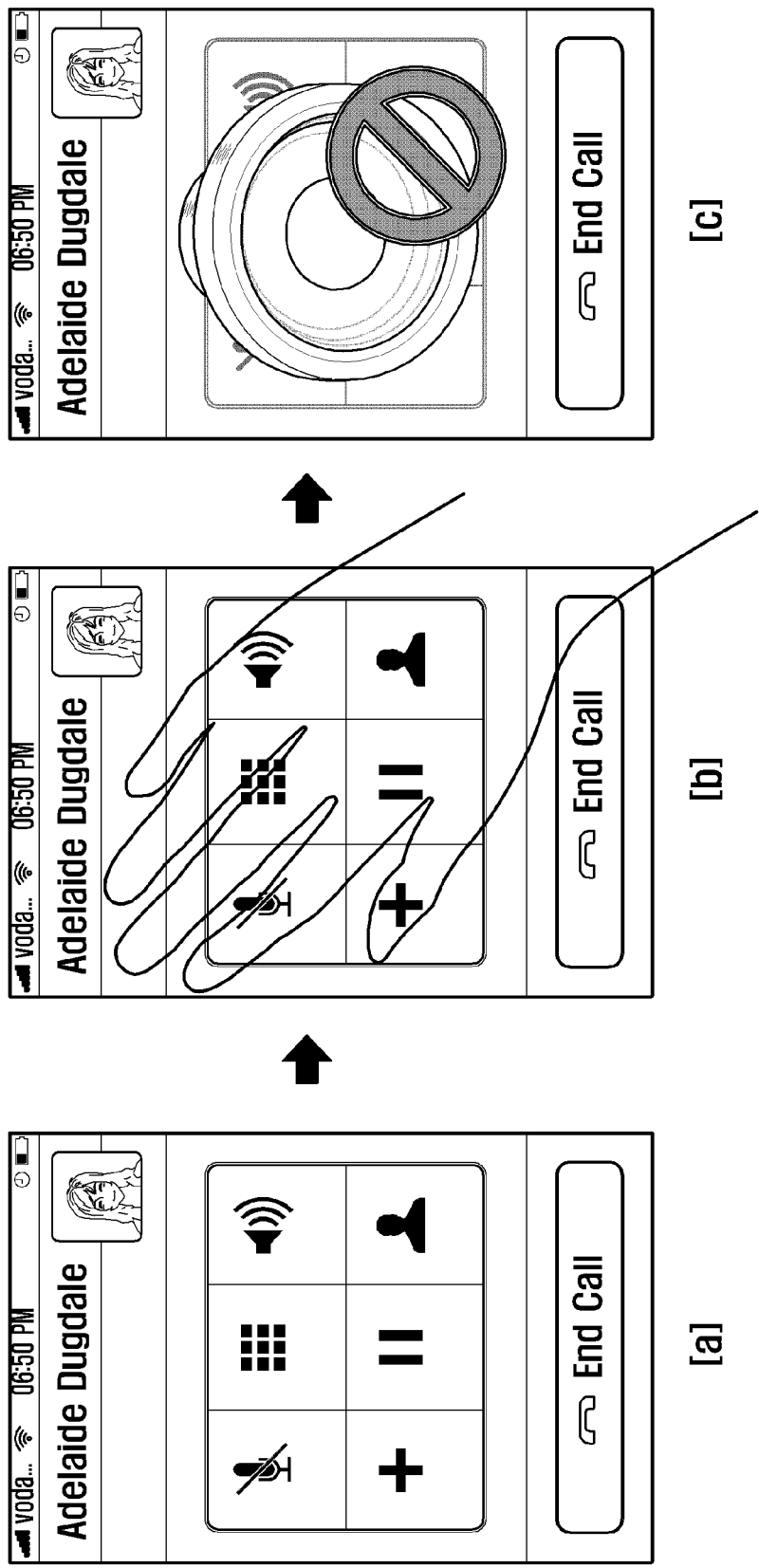
FIG. 32 is a diagram illustrating an output screen of a user interface providing device using touch shape-based information according to exemplary embodiments of the present invention.

Exemplary embodiments describe a function performed by the user interface device 10 when a user inputs an action of covering or hiding the display unit 11 with a palm on a phone receiving screen with reference to FIGS. 31 and 32.

FIG. 31 is a flowchart illustrating a method of providing a user interface according to exemplary embodiments of the present invention.

The controller 13 may control the display unit 11 to display an incoming call notification (3101). The controller 13 may output a ring tone through a sound output unit (not shown) while displaying incoming call notification through the display unit 11.

The controller 13 may determine whether a user's touch action input occurs through the sensor 12 (3102).

If a user's touch action input occurs, the controller 13 may determine a contact area (3103) and an area of the contact area (3104). If no touch action input occurs, the display unit 11 may continue to display an incoming call notification for a set time period.

The controller 13 may determine whether the area of the contact area is equal to or greater than a predetermined critical area value (3105). The predetermined critical area value may, for example, correspond to the average size of a user's hand, which can be set according the user interface device 10 manufacturer's preference.

To determine whether the user hides the display unit 11 with an entire palm, the controller 13 determines whether the area of the contact area is equal to or greater than the predetermined critical area value.

If the area of the contact area is equal to or greater than the predetermined critical area value, the controller 13 may perform a reception rejection function (3106). In this case, the controller 13 may control the display unit 11 to display a communication termination message (e.g., incoming call rejection). In some cases, the controller 13 can change the incoming call notification from a ring tone to silence or a vibration. The controller 13 may also control the display unit 11 to display an image representing silence or a vibration.

If the area of the contact area is less than a predetermined critical area value at step 3105, the controller 13 may maintain the incoming call notification state (3107).

FIG. 32 is a diagram illustrating an output screen of the user interface providing device 10 using touch shape-based information according to exemplary embodiments of the present invention.

FIG. 32[*a*] illustrates a phone receiving screen, and FIG. 32[*b*] illustrates an example in which a user covers the phone receiving screen with the user's palm. FIG. 32[*c*] illustrates a changed screen in response to the user covering the phone receiving screen with the user's palm and illustrates an image representing silence.

Embodiment 11

Exemplary embodiments describe a function performed by the user interface device 10 when a user inputs an action of hiding the display unit 11 with a palm on a moving picture or music reproduction screen with reference to FIGS. 31 and 32.

Figure 33:
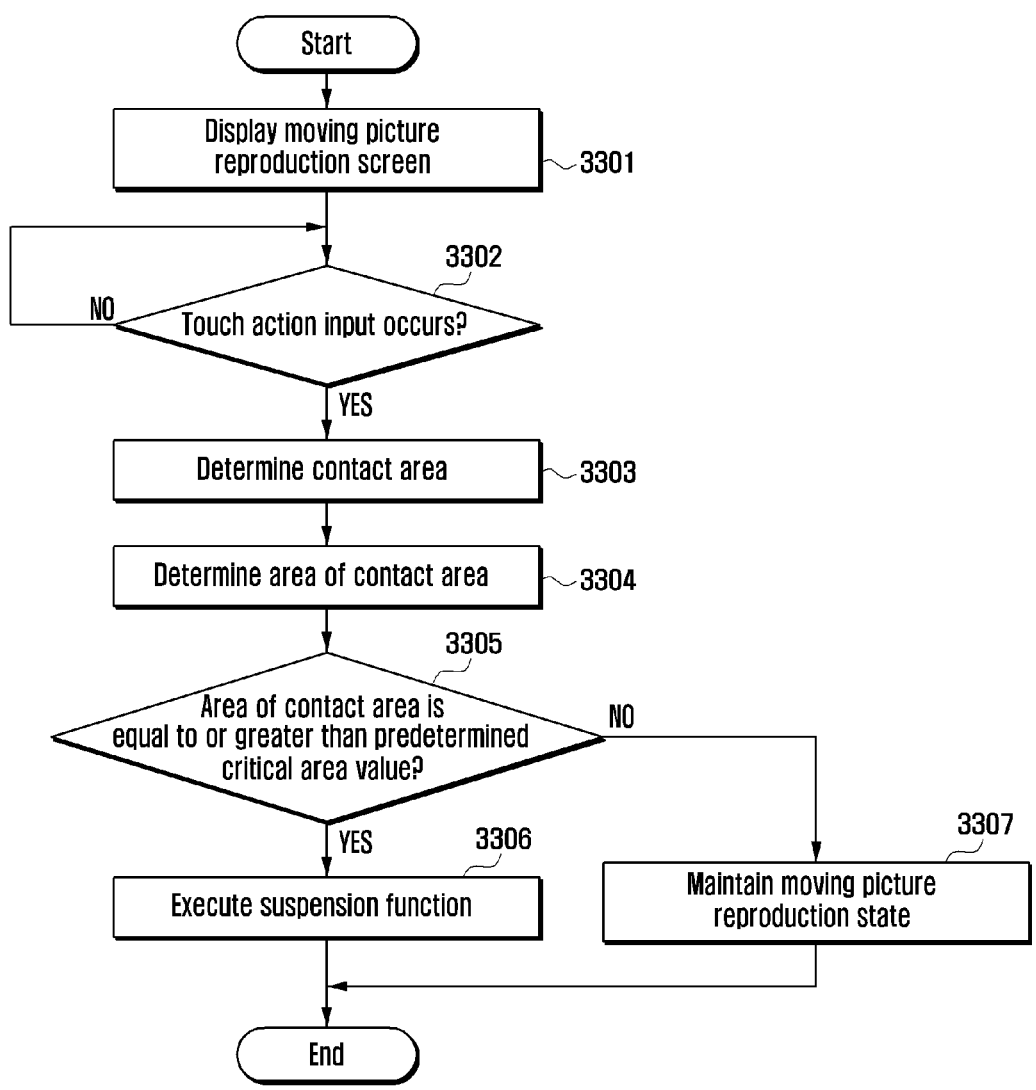
FIG. 33 is a flowchart illustrating a method of providing a user interface according to exemplary embodiments of the present invention.

FIG. 33 is a flowchart illustrating a method of providing a user interface according to exemplary embodiments of the present invention.

The controller 13 controls the display unit 11 to display a moving picture reproduction screen (3301). A moving picture reproduction screen may be a screen displaying an image file or a video file such as, for example, a movie, film, video clip, or a streaming video.

The controller 13 may determine whether a user's touch action input occurs through the sensor 12 (3302).

If the user's touch action input occurs, the controller 13 may determine a contact area (3303) and an area of the contact area (3304). If the user's touch action input does not occur, the display unit 11 continues to display the moving picture reproduction screen 3301.

The controller 13 may determine whether the area of the contact area is equal to or greater than a predetermined critical area value (3305). To determine whether the user is hiding the display unit 11 with the user's palm, the controller 13 may determine whether the area of the contact area is equal to or greater than the predetermined critical area value. The predetermined critical area value may, for example, correspond to the average size of a user's hand, which can be set according the user interface device 10 manufacturer's preference.

If the area of the contact area is equal to or greater than the predetermined critical area value, the controller 13 may execute a suspension function to suspend reproduction of the moving picture (3306). For example, the controller 13 may control the display unit 11 to display a mark representing suspension.

If the area of the contact area is less than the predetermined critical area value at step 3305, the controller 13 may maintain the moving picture reproduction state (3307).

Figure 34:
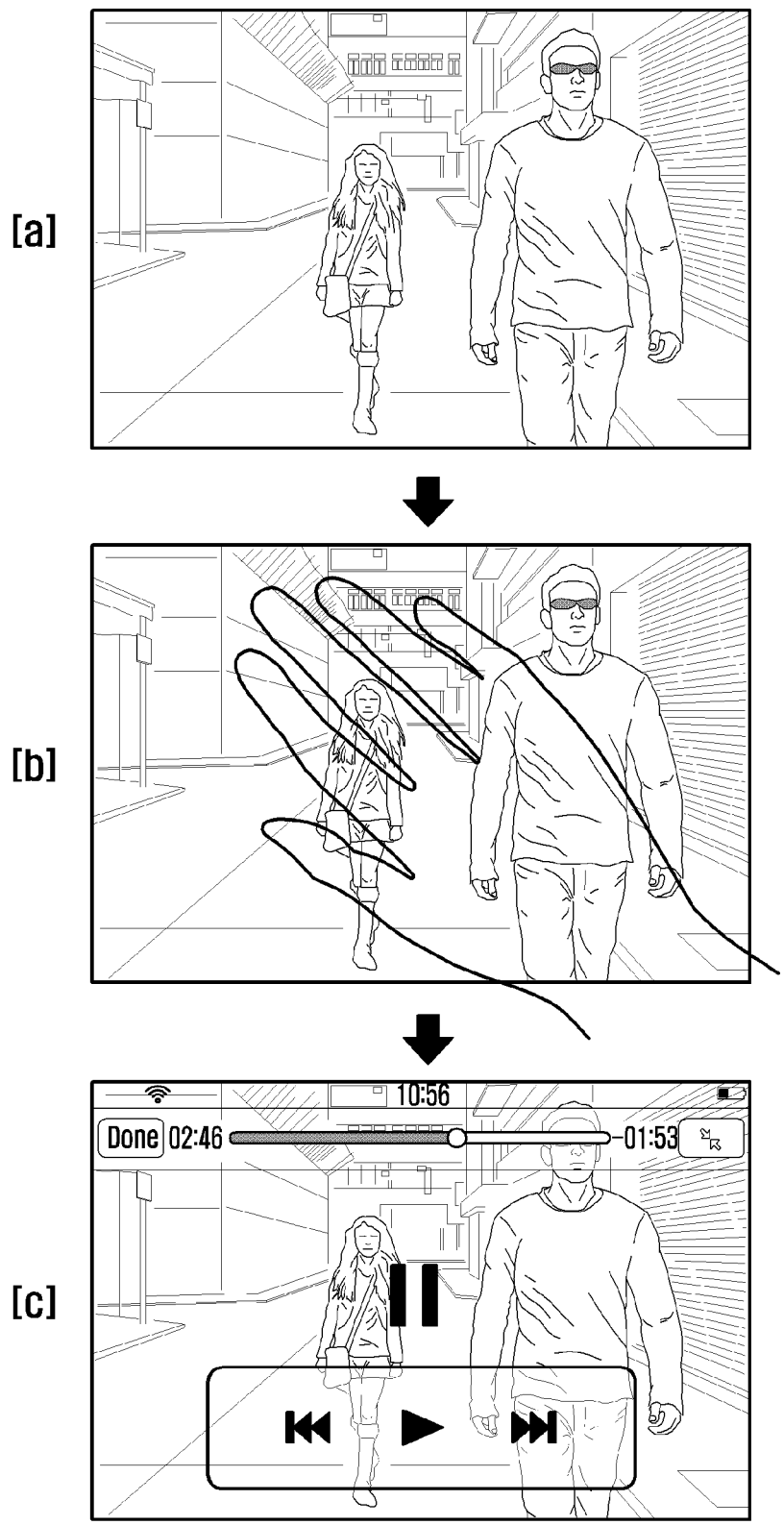
FIG. 34 is a diagram illustrating an output screen of a user interface providing device using touch shape-based information according to exemplary embodiments of the present invention.

FIG. 34 is a diagram illustrating an output screen of a user interface providing device using touch shape-based information according to an eleventh exemplary embodiment of the present invention.

FIG. 34[*a*] illustrates a moving picture reproduction screen, and FIG. 34[*b*] illustrates an example in which the user covers the phone receiving screen with the user's palm. FIG. 34[*c*] illustrates a changed screen illustrating a mark representing suspension in response to the user covering the moving picture reproduction screen with the user's palm.

As described above, according to the present invention, user interfaces can provide various user-friendly inputs using a display unit.

Further, a user can quickly and accurate provide input in a user interface of a device in which a small-sized display is mounted.

A method of executing an instruction, as described hereinabove with reference to FIGS. 1 to 34, according to information based on at least one user finger being detected by an optical touch sensor, a capacitance touch sensor, or a pressure-sensitive touch sensor can be recorded as a program and/or encoded in a computer-readable recording medium. For example, the instruction may be a computer-executable instruction encoded on one or more computer-readable recording media. Computer-readable recording media may include, for example, magnetic media such as a hard disk drive, a persistent or non-persistent solid-state memory (e.g., Flash memory, Magnetic RAM, etc.), or any other suitable storage media, but is not limited thereto. It should be appreciated that, as used herein, a computer-readable recording medium may refer to any tangible storage media having at least one physical property that may be altered in some way during a process of recording data thereon. For example, a magnetization state of a portion of a physical structure of a computer-readable medium may be altered during a recording process. An electronic device, such as, for example, a computer or a mobile phone, may execute the instruction to implement various exemplary embodiments of the invention as described hereinabove.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device to provide a user interface, the device comprising:
a display unit configured to display a screen of an application in at least part of the display unit;
a sensor configured to generate a sensor signal in response to detection of a touch input that is input while a function of the application is activated; and a controller configured to:
  activate the function of the application;
  receive the sensor signal from the sensor;
  determine an area corresponding to the touch input in the screen of the application based on the received sensor signal; and
  deactivate the activated function of the application in response to a determination that a value of the area is equal to or greater than a critical area value and maintain activation of the function in response to a determination that the value of the area is greater than zero and less than the critical area value.

2. The device of claim 1, wherein the controller is configured to activate an incoming call notification of a call application.

3. The device of claim 2, wherein the controller is configured to deactivate the activated incoming call notification when the value of the area is equal to or greater than the critical area value.

4. The device of claim 3, wherein the controller is further configured terminate the call application when the value of the area is equal to or greater than the critical area value after the incoming call notification is activated.

5. The device of claim 1, wherein the controller is configured to activate a ringtone of an incoming call notification of a call application, and to deactivate the ringtone of the incoming call notification when the value of the area is equal to or greater than the critical area value.

6. The device of claim 5, wherein the controller is further configured to change the incoming call notification to a silence or a vibration when the ringtone of the incoming call notification is deactivated.

7. The device of claim 1, wherein the controller is configured to activate a playback function of a moving picture application or a music play application.

8. The device of claim 7, wherein the controller is further configured to deactivate the activated playback function when the value of the area is equal to or greater than the critical area value.

9. The device of claim 8, wherein the controller is further configured to control the display unit to display a mark representing the deactivated playback function.

10. The device of claim 1, wherein the critical area value is established based on an average hand size of a user.

11. The device of claim 1, wherein the controller is further configured to:
  cause, in response to the determination that the value of the area is equal to or greater than the critical area value, the display unit to display a mark representing deactivation of the function.

12. A method of providing a user interface, the method comprising:
  displaying a screen of an application in at least a part of a display unit;
  activating a function of the application;
  detecting a touch input that is input while the function of the application is activated;
  determining an area corresponding to the touch input in the screen of the application; and
  deactivating the activated function of the application in response to a determination that a value of the area is equal to or greater than a critical area value and maintaining activation of the function in response to a determination that the value of the area is greater than zero and less than the critical area value.

13. The method of claim 12, wherein activating the function of the application comprises activating an incoming call notification of a call application.

14. The method of claim 13, wherein deactivating the activated function comprises deactivating the activated incoming all notification when the value of the area is equal to or greater than the critical area value.

15. The method of claim 14, further comprising:
  terminating the call application when the value of the area is equal to or greater than the critical area value after the incoming call notification is activated.

16. The method of claim 12, wherein:
  the activated function of the application is a ringtone of an incoming call notification of a call application; and
  deactivating the activated function comprises deactivating the ringtone of the incoming call notification when the value of the area is equal to or greater than the critical area value.

17. The method of claim 16, further comprising:
  changing the incoming call notification to a silence or a vibration when the ringtone of the incoming call notification is deactivated.

18. The method of claim 12, wherein activating the function of the application comprises activating a playback function of a moving picture application or a music play application.

19. The method of claim 18, wherein deactivating the activated function comprises deactivating the activated playback function when the value of the area is equal to or greater than the critical area value.

20. The method of claim 19, further comprising displaying a mark representing the deactivated playback function.

21. The method of claim 12, wherein the critical area value is established based on an average hand size of a user.

22. The method of claim 12, further comprising:
  causing, at least in part, a mark representing deactivation of the function to be displayed in response to the determination that the value of the area is equal to or greater than the critical area value.

* * * * *